United States Patent
Ishido et al.

(10) Patent No.: US 8,282,531 B2
(45) Date of Patent: Oct. 9, 2012

(54) ENGINE ROTATIONAL SPEED CONTROL APPARATUS

(75) Inventors: Masanori Ishido, Atsugi (JP); Atsufumi Kobayashi, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 446 days.

(21) Appl. No.: 12/752,571

(22) Filed: Apr. 1, 2010

(65) Prior Publication Data

US 2010/0261576 A1    Oct. 14, 2010

(30) Foreign Application Priority Data

Apr. 14, 2009  (JP) ................................. 2009-097619

(51) Int. Cl.
| | |
|---|---|
| *B60W 10/04* | (2006.01) |
| *B60W 10/10* | (2006.01) |
| *G06F 7/00* | (2006.01) |
| *G06F 17/00* | (2006.01) |
| *G06F 19/00* | (2011.01) |

(52) U.S. Cl. ............ 477/110; 477/111; 701/54; 701/61; 701/104; 701/110

(58) Field of Classification Search .................. 477/110, 477/111, 115, 120; 701/54, 56, 61, 101, 701/104, 110
See application file for complete search history.

(56) References Cited

U.S. PATENT DOCUMENTS

| | | | | |
|---|---|---|---|---|
| 6,269,289 B1 * | 7/2001 | Toukura et al. | ................... | 701/1 |
| 6,866,610 B2 * | 3/2005 | Ito | .................................. | 477/43 |
| 7,534,190 B2 * | 5/2009 | Tabata et al. | ...................... | 477/3 |
| 7,591,130 B2 * | 9/2009 | Ito | ................................. | 60/277 |
| 2009/0301451 A1 * | 12/2009 | Ito | ................................. | 123/674 |

FOREIGN PATENT DOCUMENTS

| | | | |
|---|---|---|---|
| JP | 2003-035191 | | 2/2003 |
| JP | 2005076673 A | * | 3/2005 |

* cited by examiner

*Primary Examiner* — Tisha Lewis
(74) *Attorney, Agent, or Firm* — Global IP Counselors, LLP

(57) ABSTRACT

An engine rotational speed control apparatus is provide to prevent a degradation of fuel efficiency caused by an unnecessary increase of the rotational speed of an engine when a depression amount of an accelerator pedal is briefly increased and then immediately decreased. In particular, when the vehicle is accelerated, an optimum fuel efficiency operating point along an optimum fuel efficiency curve is not moved immediately to another optimum fuel efficiency operating point corresponding to a new target drive force. Instead, the target drive force is reached by increasing the engine load while increasing the engine rotational speed as little as possible, and thus using an operating point that does not lie on the optimum fuel efficiency curve.

9 Claims, 11 Drawing Sheets

ENGINE ROTATIONAL SPEED CONTROL APPARATUS

CROSS-REFERENCE TO RELATED APPLICATIONS

This application claims priority under 35 U.S.C.§119 to Japanese Patent Application No. 2009-097619, filed on Apr. 14, 2009. The entire disclosure of Japanese Patent Application No. 2009-097619 is hereby incorporated herein by reference.

BACKGROUND

1. Field of the Invention

The present invention generally to controlling a power train that includes an engine and a continuously variable transmission. More specifically, the present invention relates to an engine rotational speed control apparatus for a power train that improves fuel efficiency when a requested output of the engine increases or decreases.

2. Background Information

Engines are sometimes provided with a control apparatus that is designed to improve fuel efficiency (i.e., reduce fuel consumption). An example of a conventional engine control technology is disclosed in Japanese Laid-Open Patent Publication No. 2003-035191 that is designed to improve fuel efficiency of an engine. In this conventional technology, the engine rotational speed is controlled by controlling a gear ratio of a continuously variable transmission in response to any given engine output power request such that the engine rotational speed lies on an optimum fuel efficiency operation curve made up of optimum fuel efficiency operating points. The optimum fuel efficiency operating points are based on an engine torque and an engine rotational speed at which a requested engine output can be achieved with a minimum fuel consumption. In other words, the conventional technology controls the engine rotational speed such that the requested engine output is always delivered using an optimum fuel efficiency operating point lying on the optimum fuel efficiency operation curve.

SUMMARY

It has been discovered that with the conventional engine control described above (in which the requested engine output power is always achieved with an optimum fuel efficiency operating point lying on an optimum fuel efficiency operation curve), the actual fuel efficiency achieved is not necessarily as good as expected when the requested engine output increases and decreases due to frequent operation of an accelerator pedal. Reasons why the fuel efficiency is poorer than expected will now be explained.

Consider a case in which a driver of a vehicle depresses an accelerator pedal of the vehicle and then immediately lets up on the accelerator pedal. When the accelerator pedal depression amount is increased, the operating point of the engine is shifted from a pre-depression optimum fuel efficiency operating point corresponding to before the increase of the accelerator pedal depression amount to a post-depression optimum fuel efficiency operating point corresponding to after the increase of the accelerator pedal depression amount. During this increase of the accelerator pedal depression amount, the engine rotational speed and the engine torque both increase so as to achieve the increased requested engine output resulting from the increased depression of the accelerator pedal. Conversely, when the accelerator pedal depression amount is decreased, the operating point of the engine is shifted from the post-depression (a pre-release) optimum fuel efficiency operating point to a post-release optimum fuel efficiency operating point corresponding to after the accelerator pedal depression amount has been decreased. During this increase of the accelerator pedal depression amount, the engine rotational speed and the engine torque decrease so as to achieve the decreased requested engine output resulting from the decreased depression of the accelerator pedal.

When the depression amount of the accelerator pedal is increased, a comparatively large amount of fuel is consumed in order to increase the engine rotational speed from a rotational speed corresponding to the pre-depression optimum fuel efficiency operating point to a rotational speed corresponding to the post-depression optimum fuel efficiency operating point. The fuel consumption amount required to increase the engine rotational speed in order to reach the post-depression optimum fuel efficiency operating point using the conventional method is larger than the improvement to the fuel consumption amount that would be obtained by shifting the engine operating point from the pre-depression optimum fuel efficiency operating point to the post-depression optimum fuel efficiency operating point in order to achieve the increased requested engine output.

If, in the conventional manner, the engine torque and the engine rotational speed are increased so as to satisfy an increased requested engine output resulting from an increased depression amount of the accelerator pedal by immediately shifting the engine operating point from a pre-depression optimum fuel efficiency operating point to a post-depression optimum fuel efficiency operating point when the depression amount of the accelerator pedal is increased, and if the engine torque and the engine rotational speed are then decreased so as to satisfy a decreased requested engine output resulting from decreased depression amount of the accelerator pedal by shifting the engine operating point from the post-depression (a pre-release) optimum fuel efficiency operating point to a post-release optimum fuel efficiency operating point when the depression amount of the accelerator pedal is decreased, then, as explained above, the fuel consumption amount required to increase the engine rotational speed will be larger than the aforementioned fuel consumption amount improvement. Consequently, the fuel consumption (fuel efficiency) will not be as good as expected even though an optimum fuel efficiency control is being executed.

One object of the present invention is to provide an engine rotational speed control apparatus for a power train that can further improve the fuel efficiency obtained when a requested engine output increases and decreases. The proposed engine rotational speed control apparatus is based on the idea that when a request to increase the engine output occurs, a contribution to improving the fuel efficiency can be made by not immediately changing the engine operating point from a pre-increase optimum fuel efficiency operating point corresponding to before the requested engine output increased to a post-increase optimum fuel efficiency operating point corresponding to after the requested engine output increased. Instead, the increased requested engine output is initially achieved by temporarily setting the engine rotational speed to a rotational speed lower than a rotational speed required to reach the post increase optimum fuel efficiency operating point and delivering the requested engine output at the lower rotational speed. Temporarily delivering the requested engine output using a lower engine rotational speed decreases the fuel consumption because the amount of fuel required to increase the engine rotational speed to the lower engine rotational speed is smaller than the amount of fuel required to increase the engine rotational speed to the post-increase optimum fuel efficiency operating point. More specifically, the fuel consumption is decreased by a amount corresponding to a difference (decrease amount) between the lower engine rotational speed and the engine rotational speed of the post-increase optimum fuel efficiency operating point.

In order to achieve the aforementioned object, an engine rotational speed control apparatus is provided that comprises a fuel economy consumption operating point computing section, a rotational speed suppression operating point computing section, a requested engine output change detecting section, a fuel amount comparing section and a continuously variable transmission control section. The fuel economy consumption operating point computing section is configured to determine a fuel economy consumption operating point based on a combination of an engine rotational speed and an engine torque lying on a fuel economy consumption operation curve that achieves a requested engine output with a scheduled fuel economy consumption. The rotational speed suppression operating point computing section is configured to determine a rotational speed suppression operating point based on a combination of the engine rotational speed and the engine torque lying on a rotational speed suppressing operation curve that achieves the requested engine output with the engine rotational speed being lower than would be obtained using the fuel economy consumption operating point lying on the fuel economy consumption operation curve. The requested engine output change detecting section is configured to detect a change in the requested engine output. The fuel amount comparing section is configured to determine if a fuel efficiency degradation amount is larger than a rotational speed restoration fuel consumption amount upon the requested engine output change detecting section detecting that the requested engine output has increased to an increased requested engine output. The fuel efficiency degradation fuel increase amount indicates an amount by which a fuel consumption amount that would result if the increased requested engine output was achieved using the rotational speed suppression operating point exceeds a fuel consumption amount that would result if the increased requested engine output was achieved using another fuel economy consumption operating point of the fuel economy consumption operation curve that corresponds to the requested engine output. The rotational speed restoration fuel consumption amount indicates an amount of fuel that would be consumed by increasing the engine rotational speed to move the rotational speed suppression operating point from the rotational speed suppressing operation curve to the another fuel economy consumption operating point corresponding to the requested engine output. The continuously variable transmission control section is configured to control the engine rotational speed by controlling the gear ratio of the continuously variable transmission. The increased requested engine output is achieved using the rotational speed suppression operating point before the fuel amount comparing section determines that the fuel efficiency degradation fuel increase amount is larger than the rotational speed restoration fuel consumption amount. The increased requested engine output is further achieved using the fuel economy consumption operating point after the fuel amount comparing section determines that the fuel efficiency degradation fuel increase amount is larger than the rotational speed restoration fuel consumption amount. The requested engine output is further achieved using the fuel economy consumption operating point when the requested engine output change detecting section detects that the requested engine output has decreased.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
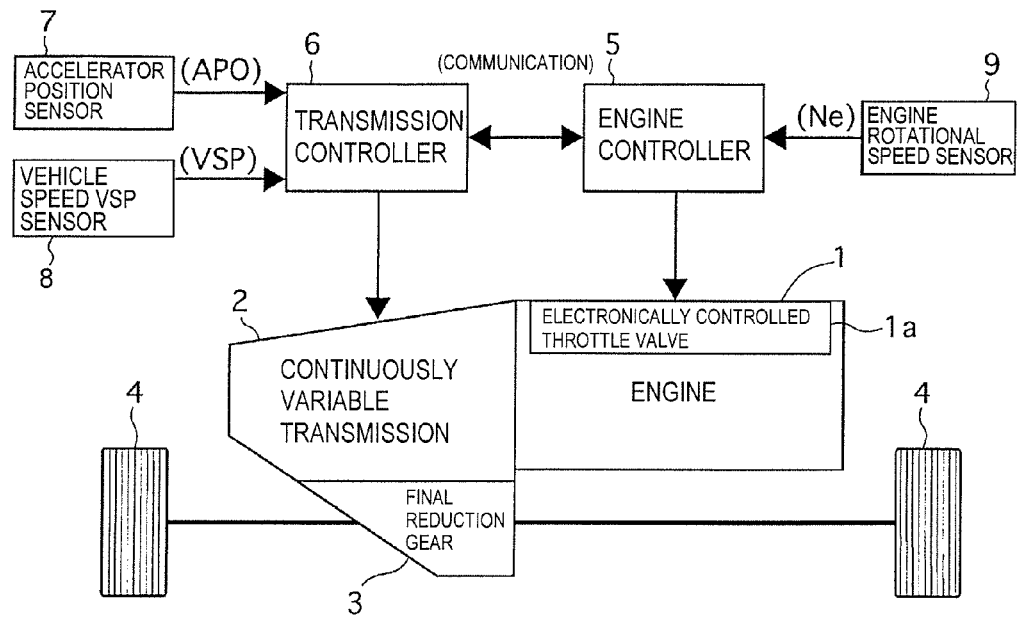
FIG. 1 is a system block diagram showing a power train with an engine rotational speed control apparatus according to a first embodiment.

Referring initially to FIG. 1, a power train is illustrated with an engine rotational speed control apparatus in accordance with a first embodiment. In this embodiment, the power train includes an engine 1 and a continuously variable transmission 2. The rotation of the engine 1 transmitted through the continuously variable transmission 2 where the rotational speed is changed according to the gear ratio of the continuously variable transmission 2 before being delivered downstream toward the drive wheels of a vehicle. The power train is configured to be used in a front wheel drive vehicle. The rotation from the continuously variable transmission 2 is distributed to the left and right drive wheels 4 by a final reduction gear 3 that includes a differential.

The output of the engine 1 is controlled by an engine controller 5. The continuously variable transmission 2 can be, for example, a toroidal continuously variable transmission or a V-belt continuously variable transmission. The continuously variable transmission 2 is controlled by a transmission controller 6. An accelerator position sensor 7 is used to detect an accelerator position (accelerator pedal depression amount) APO. A signal indicative of the accelerator position APO is transmitted from the accelerator position sensor 7 to the engine controller 5. A vehicle speed sensor 8 is used to detect a vehicle speed VSP. A signal indicative of the vehicle speed VSP is transmitted from the vehicle speed sensor 8 to the engine controller 5. An engine rotational speed sensor 9 is used to detect an engine rotational speed Ne. A signal indicative of the engine rotational speed Ne is transmitted from the engine rotational speed sensor 9 to the transmission controller 6. In addition to the information directly transmitted to the individual controllers 5 and 6, internal information can be communicated between the engine controller 5 and the transmission controller 6.

The engine controller 5 basically controls the output of the engine 1 by controlling an opening degree of an electronically controlled throttle valve 1a in response to vehicle operating conditions caused by a driver. The vehicle operating conditions used by the engine controller 5 to opening degree of the electronically controlled throttle valve 1a includes the accelerator position APO, the vehicle speed VSP and the engine rotational speed Ne. However, the engine controller 5 can vary the output torque delivered from the engine 1 under the same vehicle operating conditions by varying the opening degree of the electronically controlled throttle valve 1a. In this way, the engine controller 5 can obtain the engine torque required to achieve a targeted operating point when executing an engine operating point control (explained later).

Figure 2:
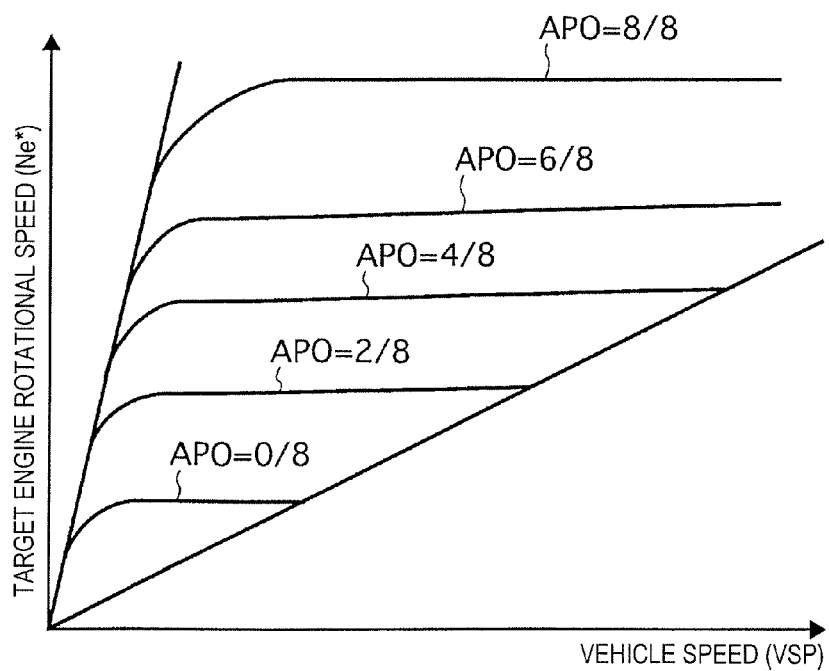
FIG. 2 is a plot of gear shifting patterns used to find a target engine rotational speed in relation to shifting of a continuously variable transmission of the power train shown in FIG. 1.

The transmission controller 6 basically finds a target engine rotational speed Ne* based on the vehicle speed VSP and the accelerator position APO using a gear shifting pattern like that shown in FIG. 2. The transmission controller 6 then controls a gear ratio of the continuously variable transmission 2 such that the engine rotational speed Ne is controlled to substantially match the target rotational speed Ne*. However, the transmission controller 6 can vary the rotational speed Ne delivered from the engine 1 under the same vehicle speed VSP and accelerator position APO by varying the gear ratio of the continuously variable transmission 2. In this way, the transmission controller 6 can obtain the engine rotational speed required to achieve a targeted operating point when executing an engine operating point control (explained later).

Figure 3:
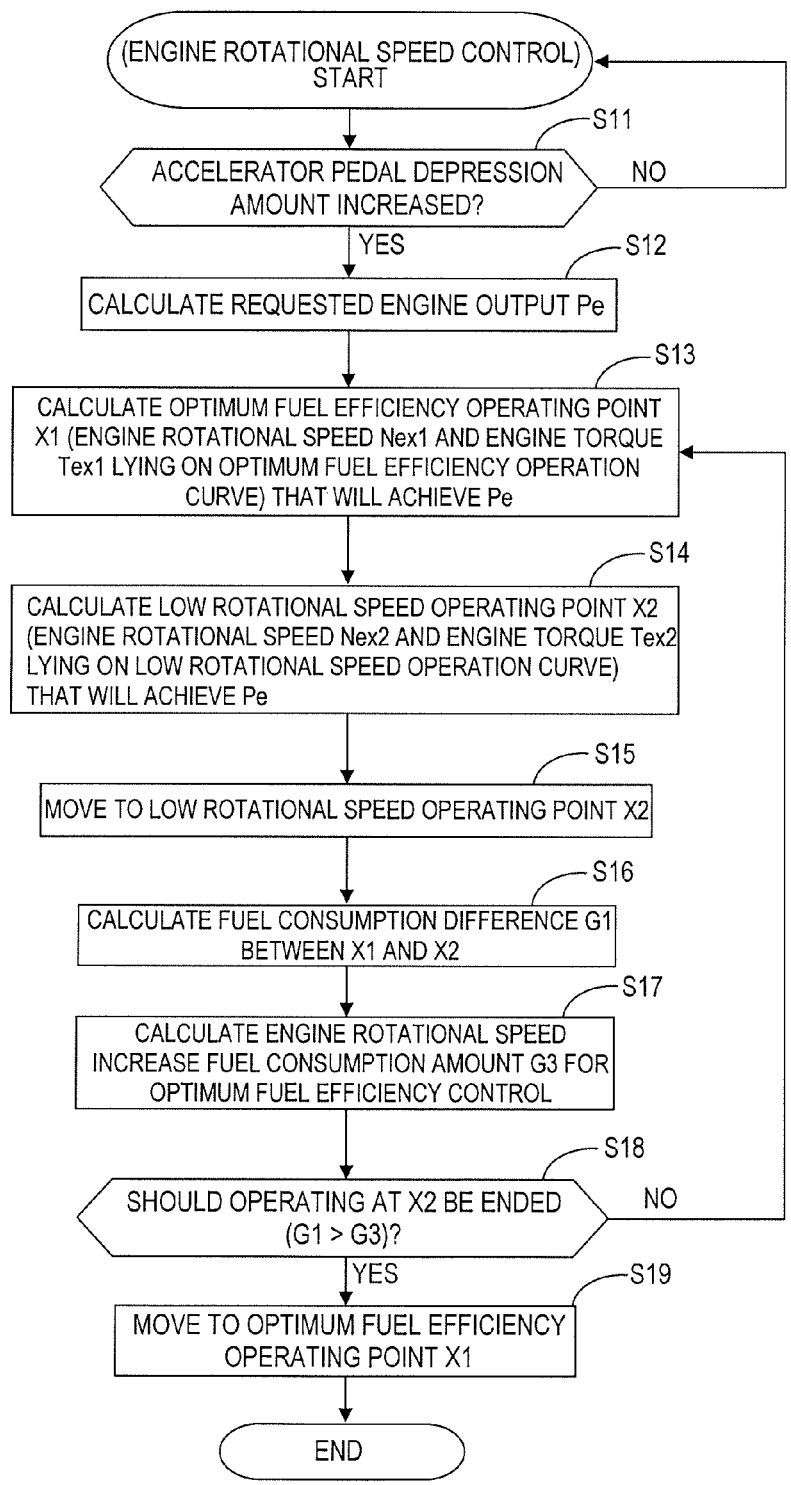
FIG. 3 is a flowchart of an engine operating point control program executed by the engine rotational speed control apparatus according to the first embodiment employed in the power train shown in FIG. 1.

In order to execute an engine operating point control with respect to the aforementioned power train, the transmission controller 6 executes the control program shown in FIG. 3 repeatedly once per prescribed time interval in coordination with the engine controller 5. In step S11, at least one of the controllers 5 and 6 compares a current accelerator position $APO_n$ read in the current control cycle to a previous accelerator position $APO_{n-1}$ read in a previous control cycle to determine if a requested engine output has increased due to the accelerator pedal depression amount being increased. If the accelerator pedal depression amount has not increased, then the transmission controller 6 returns to the start and waits because the requested engine output has not increased. Thus, it is not necessary to execute the engine operating point control. While waiting, at least one of the controllers 5 and 6 execute a normal operating point control that will now be explained.

Figure 4:
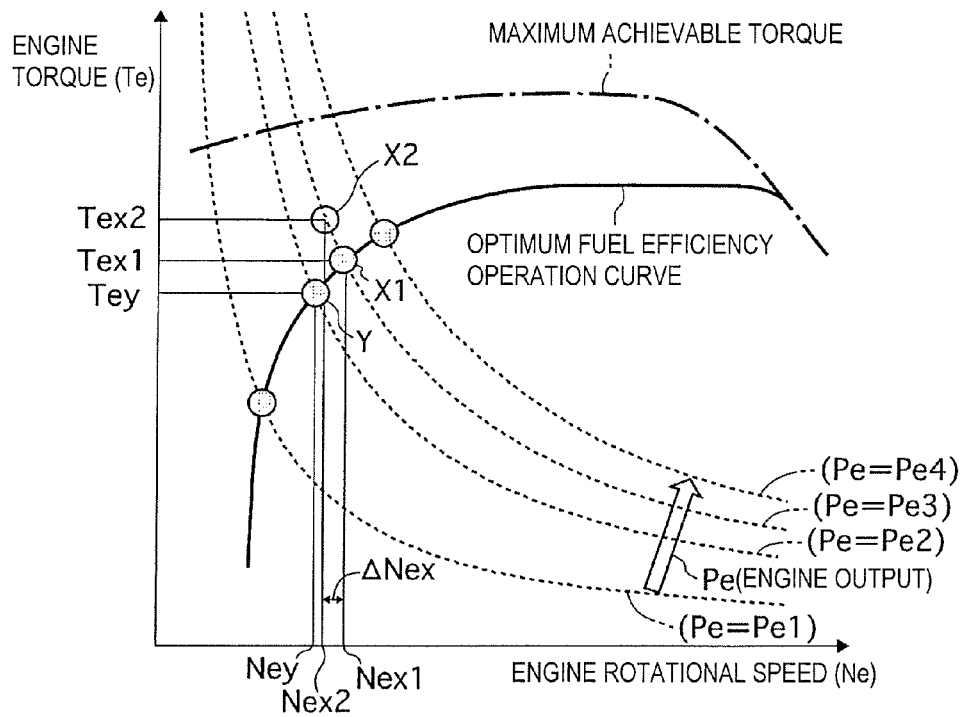
FIG. 4 is an engine performance characteristic plot for the engine of the power train shown in FIG. 1, which explains the principles of the engine rotational speed control of the engine rotational speed control apparatus shown in FIG. 1.

FIG. 4 is an engine performance characteristic diagram expressing a two-dimensional map of torque Te versus rotational speed Ne for the engine 1. The broken-line curves are constant output curves indicating combinations of engine rotational speed Ne and engine torque Te that can be used to achieve each of several different engine output power levels Pe (Pe1, Pe2, Pe3 and Pe4). The single-dot-chain-line curve is a maximum torque curve indicating the maximum torque the engine 1 can generate. The solid-fine curve is an optimum fuel efficiency operation curve made up of optimum fuel efficiency operating points (Y, X1, etc.), with each operating point comprising a combination of an engine rotational speed and an engine torque at which a given engine output Pe (Pe1, Pe2, Pe3 and Pe4) can be achieved with a minimum amount of fuel consumption. In this embodiment, this optimum fuel efficiency operation curve is used as an economy (low) fuel consumption operation curve with the optimum fuel efficiency operating points lying on this curve being used as economy (low) fuel consumption operating points.

During normal operating point control, a requested engine output is determined based on operating conditions of the vehicle and an optimum fuel efficiency operating point (e.g., Y or X1) is found by using the corresponding constant output curve of FIG. 4. The engine rotational speed (Ney or Nex1) and the engine torque (Tey or Tex1) of the computed optimum fuel efficiency operating point (Y or X) are set as a target engine rotational speed and a target engine torque, respectively. The engine controller 5 controls the opening degree of the electronically controlled throttle valve 1a such that the engine torque Te is controlled to substantially match the target engine torque (Tey or Tex1). Also the transmission controller 6 controls the gear ratio of the continuously variable transmission 2 such that the engine rotational speed Ne is controlled to substantially match the target engine rotational speed (Ney or Nex1). Thus, the engine 1 is made to achieve the requested engine output at an optimum fuel efficiency operating point (Y or X1) and, theoretically, the requested engine output can be obtained with the best possible fuel efficiency.

In this embodiment, the scheduled gear shifting pattern (exemplified in FIG. 2) used for controlling the continuously variable transmission 2 is configured such that the target engine rotational speed Ne* is set to the engine rotational speed of an optimum fuel efficiency operating point corresponding to a driving condition (engine output Pe). Therefore, in this embodiment, the transmission controller 6 finds a target engine rotational speed Ne* based on a vehicle speed VSP and an accelerator position APO using the gear shifting pattern exemplified in FIG. 2. The transmission controller 6 then controls the continuously variable transmission 2 such that the engine rotational speed Ne is controlled to substantially match the target rotational speed Ne*. In this way, the aforementioned engine rotational speed control can be accomplished by simply controlling the engine rotational speed Ne to the engine rotational speed of the optimum fuel efficiency operating point.

However, if the optimum fuel efficiency control described above (using an optimum fuel efficiency operating point lying on an optimum fuel efficiency operation curve to achieve the requested engine output power) is always executed, then the actual fuel consumption (fuel efficiency) achieved will not necessarily as good as expected when the requested engine output increases and decreases due to frequent operation of an accelerator pedal. Reasons why the fuel efficiency is poorer than expected will now be explained.

Now considering a case in which a driver of a vehicle depresses an accelerator pedal of the vehicle and then immediately releases (returns) the accelerator pedal such that the requested engine output increases from Pe2 to Pe3 in FIG. 4 and then immediately decreases from Pe3 back to Pe2 in FIG. 4. In response to the increased depression of the accelerator pedal, the engine operating point is immediately shifted from a pre-depression optimum fuel efficiency operating point Y to a post-depression optimum fuel efficiency operating point X1 so as to achieve the increased requested engine output Pe3. Thus, the engine rotational speed Ne is increased from Ney to Nex1 and the engine torque Te is increased from Tey to Tex1. Conversely, when the accelerator pedal is released (returned), the operating point of the engine 1 is shifted from the post-depression (pre-release) optimum fuel efficiency operating point X1 to a post-release optimum fuel efficiency operating point Y and the engine rotational speed Ne and the engine torque Te are decreased to their original values so as to achieve the decreased requested engine output Pe2 resulting from the release of the accelerator pedal.

When the depression amount of the accelerator pedal is increased, a comparatively large amount of fuel is consumed in order to increase the engine rotational speed Ne from the rotational speed Ney of the pre-depression optimum fuel efficiency operating point Y to the rotational speed Nex1 of the post-depression optimum fuel efficiency operating point. The fuel consumption amount required to increase the engine rotational speed in such a case is larger than an improvement to the fuel consumption amount that would be obtained by shifting the engine operating point from the pre-depression optimum fuel efficiency operating point Y to the post-depression optimum fuel efficiency operating point X1 in order to achieve the increased requested engine output Pe3. If, as described above, the engine torque and the engine rotational speed are increased so as to satisfy an increased requested engine output resulting from an increased depression of the accelerator pedal by immediately shifting the engine operating point from a pre-depression optimum fuel efficiency operating point Y to a post-depression optimum fuel efficiency operating point X1 when the depression amount of the accelerator pedal is increased, and if the engine torque and the engine rotational speed are decreased so as to satisfy a decreased requested engine output resulting from a release of the accelerator pedal by shifting the engine operating point from the post-depression (a pre-release) optimum fuel efficiency operating point X1 to a post-release optimum fuel efficiency operating point Y when the depression amount of the accelerator pedal is decreased, then, as explained above, the fuel consumption amount required to increase the engine rotational speed will be larger than the aforementioned fuel consumption amount improvement. Consequently, the fuel consumption (fuel efficiency) will not be as good as expected even though an optimum fuel efficiency control is being executed.

With this embodiment, when the requested engine output increases, the engine operating point is not immediately shifted from an optimum fuel efficiency operating point Y corresponding to the pre-increase requested engine output P2 (engine output requested before the increase) to an optimum fuel efficiency operating point X1 corresponding to the post-increase requested engine output P3 (engine output requested as a result of the increase). Instead, the increased requested engine output P3 is initially achieved by temporarily shifting the engine operating point to a low rotational speed operating point X2 (e.g., a rotational speed suppression operating point) having a lower engine rotational speed Nex2 than the post-increase optimum fuel efficiency operating point X1. At the low rotational speed operating point X2, the engine torque is Text, which is higher than the engine torque is Tex1 of the post-increase optimum fuel efficiency operating point X1. In this way, the amount of fuel consumed in order to increase the engine rotational speed is reduced by an amount corresponding to a decrease amount (difference) ΔNex (i.e., ΔNex=Nex1−Nex2) indicating the amount by which the engine rotational speed of the low rotational speed operating point X2 is smaller than the engine rotational speed of the post-increase optimum fuel efficiency operating point X1. Thus, a contribution to improving the fuel efficiency of an engine in situations where the requested engine output increases and decreases can be accomplished by executing an engine operating point control that temporarily utilizes a low rotational speed operating point when the requested engine output increases. Such an engine operating point control according to this embodiment will now be explained.

If an increased depression of the accelerator pedal (an increase of the requested engine output) is determined to have occurred in step S11 of FIG. 3, then at least one of the controllers 5 and 6 proceeds to step S12 and calculates the requested engine output Pe based on such information as the accelerator position APO, the vehicle speed VSP and the engine rotational speed Ne using a known calculation method. In step S13, at least one of the controllers 5 and 6 determines an optimum fuel efficiency operating point on the optimum fuel efficiency operation curve (see solid-line curve of FIG. 4) that will achieve the requested engine output Pe calculated in step S12. Thus, step S13 constitutes a fuel economy consumption operating point computing section.

Figure 5:
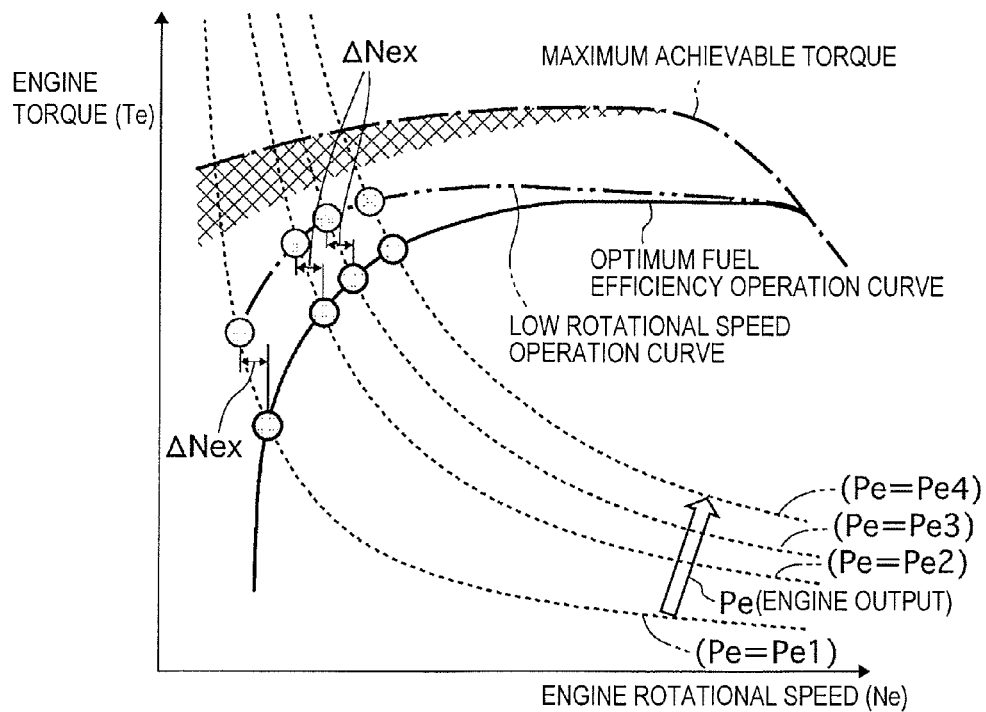
FIG. 5 is an engine performance characteristic plot showing both a low rotational speed operation curve and an optimum fuel efficiency operation curve used by the engine rotational speed control apparatus shown in FIG. 1.

In step S14, at least one of the controllers 5 and 6 uses a low rotational speed operation curve (e.g., a rotational speed suppression operation curve—exemplified with double-dot chain line in FIG. 5) to determine a low rotational speed operating point that can achieve the requested engine output Pe calculated in step S12 with an engine rotational speed that is lower than the engine rotational speed of the optimum fuel efficiency operating point. At least one of the controllers 5 and 6 then calculates the engine rotational speed Nex2 (exemplified in FIG. 4) and the engine torque Tex2 (exemplified in FIG. 4) that make up the low rotational speed operating point. Thus, step S14 constitutes a rotational speed suppression operating point computing section or a low rotational speed operating point computing section.

A method of calculating the low rotational speed operation curve (low rotational speed operating points) indicated with a double-dot chain line curve in FIG. 5 will now be explained. In order to calculate the low rotational speed operation curve, at least one of the controllers 5 and 6 use a fuel efficiency degradation amount G1 and a rotational speed restoration fuel consumption amount G2 for each engine output power (work rate) Pe (Pe1, Pe2, Pe3 and Pe4). The fuel efficiency degradation amount G1 is calculated based on a fuel consumption rate $\eta_{X1}$ [g/(W–h)] obtained with an optimum fuel efficiency operating point X1 (see FIG. 4) that achieves the engine output power Pe, a fuel consumption rate $\eta_{X2}$ [g/(W–h)] obtained with a low rotational speed operating point X2 (see FIG. 4) that achieves the engine output power Pe, and an acceleration continuation time t [h] that a certain acceleration is maintained from a certain vehicle speed determined statistically based on the driving conditions of the particular type of vehicle. The fuel efficiency degradation amount G1 indicates an amount by which the fuel efficiency degrades (fuel consumption increases) by achieving the engine output (work rate) Pe with the low rotational speed operating point X2 instead of the optimum fuel efficiency operating point X1. The rotational speed restoration fuel consumption amount G2 indicates an amount of fuel required to increase the engine rotational speed Ne from the engine rotational speed Nex2 of the low rotational speed operating point X2 to the rotational speed Nex1 of the optimum fuel efficiency operating point X1. The rotational speed restoration fuel consumption amount G2 is the fuel consumption amount required to operate a transmission actuator and overcome a change in the rotational inertia of the engine 1.

The steps of calculating the low rotational speed operation curve will now be explained.

(1) The output required to achieve a particular vehicle speed and acceleration rate is calculated. The work rate W required to drive the vehicle is calculated based on a vehicle speed VSP and a drive force F using the following equation.

$$W(W)=F[N] \times VSP[m/s]$$

The drive force F is calculated using a vehicle mass "m" and an acceleration "a". Since the vehicle mass "m" basically does not change when the vehicle is moving, the required output W is determined by the vehicle speed VSP and the acceleration "a". Thus, the required output (work rate) W is known when the vehicle speed VSP and acceleration a are known, and the required output (work rate) W can be found unambiguously based on the vehicle speed VSP and the acceleration "a".

(2) Now, the requested engine output Pe can be substituted for the required output W and an optimum fuel efficiency operating point X1 can be found as an operating point at which the requested engine output Pe can be achieved while keeping the operating point on the optimum fuel efficiency operation line. Then, the engine rotational speed Nex1 (see FIG. 4) and the engine torque Tex1 (see FIG. 4) of the optimum fuel efficiency operating point X1 can be determined. Thus, if the engine rotational speed Nex1 and the engine torque Tex1 of the optimum fuel efficiency operating point X1 are known, the fuel consumption rate $\eta_{X1}$ [g/(W–h)] at the optimum fuel efficiency operating point X1 can be determined based on an experimentally determined engine fuel consumption rate.

(3) The vehicle speed VSP$_2$ reached when the vehicle is accelerated from a particular vehicle speed VSP$_1$ at a particular acceleration "a" is basically selected by an operation of the accelerator pedal performed by a driver. Although there are differences depending on the driving environment encountered in each particular type of vehicle, a vehicle speed value to which the vehicle statistically tends to approach in general exists for each type of vehicle and statistical data can be obtained. For example, when a vehicle starts into motion at a very low acceleration from a vehicle speed VSP of 0 (VSP=0), it can be estimated that the vehicle is accelerating toward a low speed, such as in a congested traffic situation. Thus, the vehicle speed VSP$_2$ that will be reached will be low. Conversely, when a vehicle starts into motion at a high acceleration from the same vehicle speed VSP of 0 (VSP=0), it can be estimated that the vehicle is accelerating toward a high speed, e.g., such as from a highway toll booth, and the vehicle speed VSP$_2$ reached will be high. That said, the relationship expressed by the equation VSP2=VSP1+a×t exists between an initial vehicle speed VSP1 from which the vehicle starts accelerating and a final vehicle speed VSP2 at which the vehicle stops accelerating, where a is the acceleration rate and t is the amount of time during which acceleration was maintained. Thus, if the initial vehicle speed VSP1, the final vehicle speed VSP2, and the acceleration a are known, the amount of time t that the acceleration needs to be maintained can be calculated using the equation.

(4) Based on the fuel consumption rate $\eta_{X1}$ [g/(W–h)] that would obtained if the engine was operated at an optimum fuel efficiency operating point X1 where the requested output Pe is satisfied with an operating point lying on the optimum fuel efficiency operation curve, the fuel consumption rate $\eta_{X2}$ [g/(W–h)] that would obtained if the engine was operated at a low rotational speed operating point X2 where the requested output Pe is satisfied with an operating point having a lower rotational speed, and the acceleration continuation time t found in step (3) above, the fuel efficiency degradation amount G1 [g] indicating an amount by which the fuel efficiency will degrade (fuel consumption will increase) by achieving the requested engine output Pe with the low rotational speed operating point X2 instead of the optimum fuel efficiency operating point X1.

$$G1=Pe \times (\eta_{X1}-\eta_{X2}) \times t$$

Since the required output Pe, the acceleration continuation time t, and the optimum fuel efficiency operating point X1 can be determined based on the vehicle speed VSP1 and the acceleration a, the fuel efficiency degradation amount G1 can be determined by finding an operating point X2 lying on a constant output curve at which the requested output Pe can be achieved. A constant output curve corresponding to the requested output Pe is a curve made up of points, each of which are defined by an engine rotational speed ne and an engine torque Te. The constant output curve can be expressed according to the following equation.

$$Pe[W]=2\pi/60 \times Ne[\text{rpm}] \times Te[\text{Nm}]$$

Thus, as the engine rotational speed Ne changes, the required engine torque Te is automatically determined.

Figure 6:
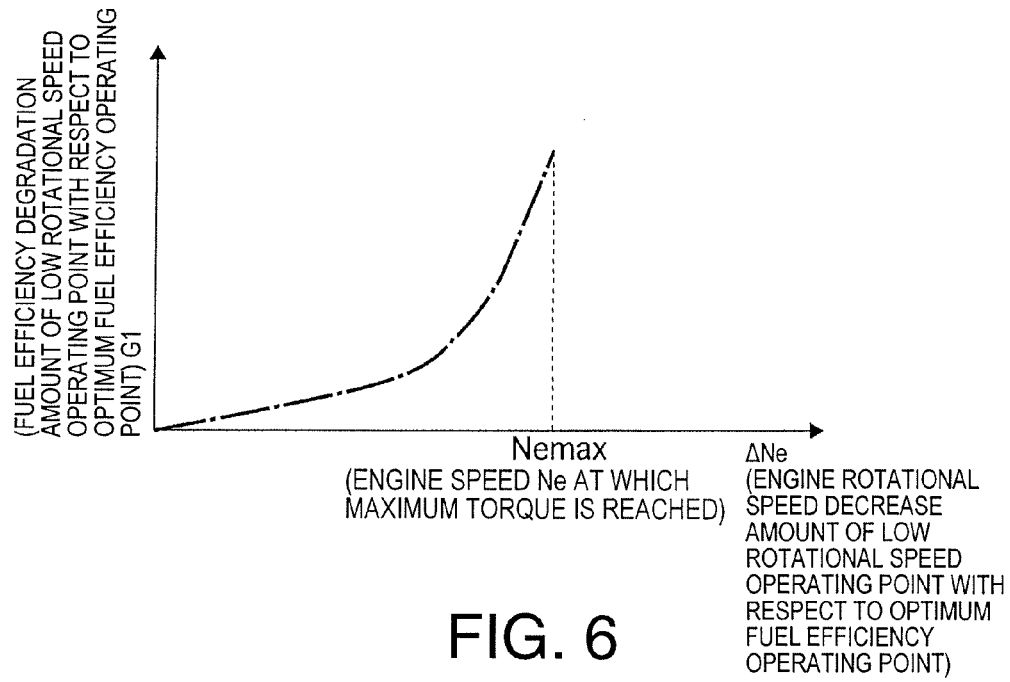
FIG. 6 is a characteristic plot of a fuel efficiency degradation fuel increase amount that indicates an amount by which a fuel consumption amount corresponding to a low rotational speed operation point exceeds a fuel consumption amount corresponding to an optimum fuel efficiency operating point for determining the low rotational speed operation curve shown in FIG. 5.

As shown in FIG. 6, the fuel increase amount G1 by which the fuel consumption that would result if the requested output Pe was produced continuously for the aforementioned acceleration continuation time t using the low rotational speed operating point X2 exceeds the fuel consumption that would result if the same requested output Pe was produced continuously for the aforementioned acceleration continuation time t at the optimum fuel efficiency operating point X1 can be calculated as a function of a difference ΔNe between the engine rotational speed Nex1 of the optimum fuel efficiency operating point X1 and the engine rotational speed Nex2 of the low rotational speed operating point X2 (i.e., an amount by which the engine rotational speed is smaller at the low rotational speed operating point X2 than at the optimum fuel efficiency operating point X1).

The reason why the fuel efficiency degradation amount G1 has the characteristic shown in FIG. 6 is that as the engine rotational speed decrease amount (difference) ΔNe increases, the rotational speed of the low rotational speed operating point X2 decreases and the load of the low rotational speed operating point X2 increases, thus causing the fuel efficiency to decline. Particularly in a region near full-load operation where the engine outputs a maximum torque corresponding to the requested output (cross hatched region in FIG. 5), the fuel efficiency degradation amount G1 increases rapidly (as shown in FIG. 6) because of an ignition timing retardation control and/or an air-fuel ratio enrichment control executed in order to avoid knocking.

Figure 7:
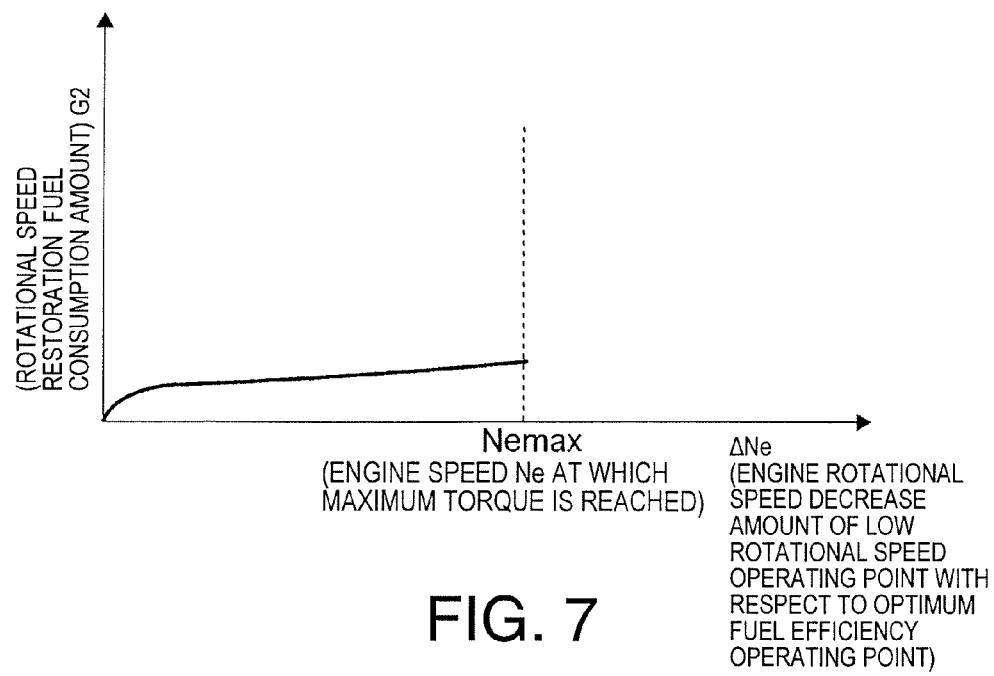
FIG. 7 is a characteristic plot of an engine rotational speed restoration fuel consumption amount that indicates an amount of fuel consumed in order to increase the engine rotational speed such that an engine operating point moves from a low rotational speed operating point to an optimum fuel efficiency operating point.

(5) Meanwhile, as shown in FIG. 7, the rotational speed restoration fuel consumption amount G2 required to raise the engine rotational speed from the engine rotational speed Nex2 of the low rotational speed operating point X2 to the engine rotational speed Nex1 of the optimum fuel efficiency operating point X1 can be calculated as a function of the engine rotational speed decrease amount (difference) ΔNe by which the engine rotational speed Nex2 of the low rotational speed operating point X2 is smaller than the engine rotational speed Nex1 of the optimum fuel efficiency operating point X1. The calculation can be accomplished in this manner because the energy of the associated increase in rotational inertia of the engine and an operation amount of an actuator used to shift the continuously variable transmission (or a V-belt pulley movement amount in the case of a V-belt type continuously variable transmission) are functions of the amount by which the engine rotational speed changes.

The reason why the rotational speed restoration fuel consumption amount G2 has the characteristic shown in FIG. 7 is that the increase of the engine rotational speed is accomplished by changing the gear ratio of the continuously variable transmission 2. Initially a comparatively large amount of fuel is required to start moving the gear shifting actuator (V-belt pulley in the case of a V-belt type continuously variable transmission) and to increase the rotational inertia of the engine. Then, after the gear ratio has been changed, it is no longer necessary to consume a large amount of fuel.

Figure 8:
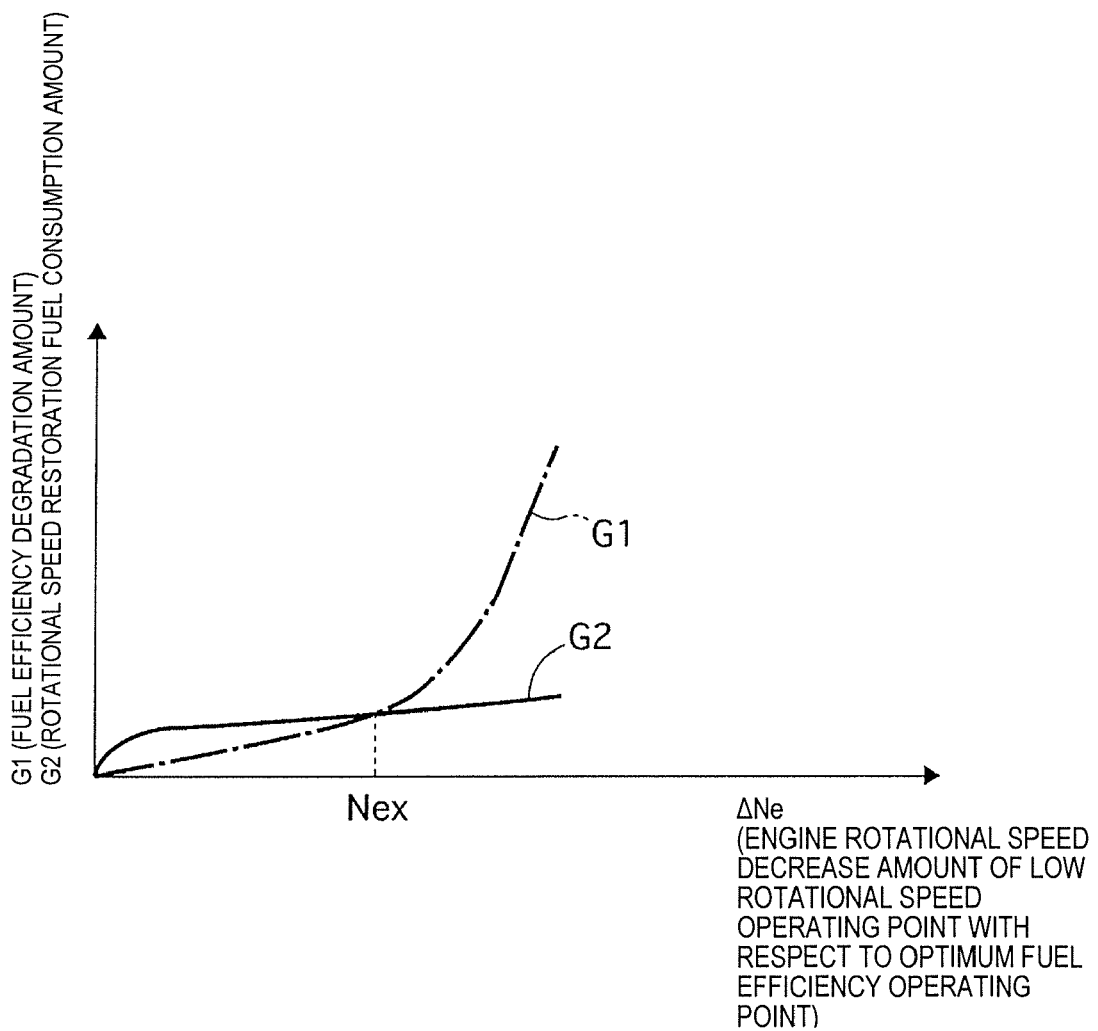
FIG. 8 is a characteristic plot of a fuel efficiency degradation fuel increase amount together with the characteristic plot of an engine rotational speed restoration fuel consumption amount shown in FIG. 7.

(6) FIG. 8 shows the characteristic curve of the fuel efficiency fuel increase amount G1 calculated in step (4) (and shown in FIG. 6) and the characteristic curve of the rotational speed restoration fuel consumption amount G2 calculated in step (5) (and shown in FIG. 7) plotted together on the same coordinate system. The value of the engine rotational speed decrease amount ΔNe where the two curves intersect is called a critical engine rotational speed decrease amount (difference) ΔNex. In a region where ΔNe is smaller than delta ΔNex (ΔNe<ΔNex), the fuel efficiency degradation amount G1 is smaller than the rotational speed restoration fuel consumption amount G2. Meanwhile, in a region where ΔNe is larger than delta ΔNex (ΔNe>ΔNex), the rotational speed restoration fuel consumption amount G2 is smaller than the fuel efficiency degradation amount G1. As shown in FIG. 4, the operating point where the requested output Pe is achieved with an engine rotational speed Nex2 that is lower than the engine rotational speed Nex1 of the optimum fuel efficiency operating point X1 by the value of the critical engine rotational speed decrease amount ΔNex (Nex2=Nex 1−ΔNex) is defined to be the low rotational speed operating point X2 (engine torque Tex2).

(7) The steps (1) to (6) are repeated for each of the requested outputs Pe (Pe1, Pe2, Pe3 and Pe4) to find a low rotational speed operating point X2 for each of the requested outputs Pe (Pe1, Pe2, Pe3 and Pe4). These operating points X2 are then connected to obtain a low rotational speed operation curve like that shown with a double-dot chain line in FIG. 5. If used within a prescribed amount of time after the requested engine output increases, the low rotational speed operation curve can reduce the fuel consumption in comparison with achieving the requested engine output with an operating point lying on the optimum fuel efficiency operation curve. Afterwards, when the prescribed amount of time has elapsed since the requested engine output increased, a better fuel efficiency is obtained by achieving the requested engine output with an operating point lying on the optimum fuel efficiency operation curve than by continuing with an operating point lying on the optimum fuel efficiency operation curve. Similarly to the calculation of the acceleration time t described above, the optimum fuel efficiency operation curve and the low rotational speed operation curve both vary depending on the vehicle speed because they are both determined using a relationship involving a particular vehicle speed, an acceleration rate, and a final vehicle speed reached after accelerating at the acceleration rate.

In step S14 of FIG. 3, using a low rotational speed operation curve like that exemplified with a double-dot chain line in FIG. 5, at least one of the controllers 5 and 6 find a low rotational speed operating point X2 (shown in FIG. 4) that lies on the low rotational speed operation curve and achieves the requested engine output Pe (calculated in step S12) with a lower engine rotational speed than the optimum fuel efficiency operating point X1 (shown in FIG. 4) and then find the engine rotational speed Nex2 and the engine torque Tex2 of the low rotational speed operating point X2. In order to find the engine rotational speed Nex2 of the low rotational speed operating point X2, it is acceptable to execute the processing shown in the block diagram of FIG. 9.

Figure 9:
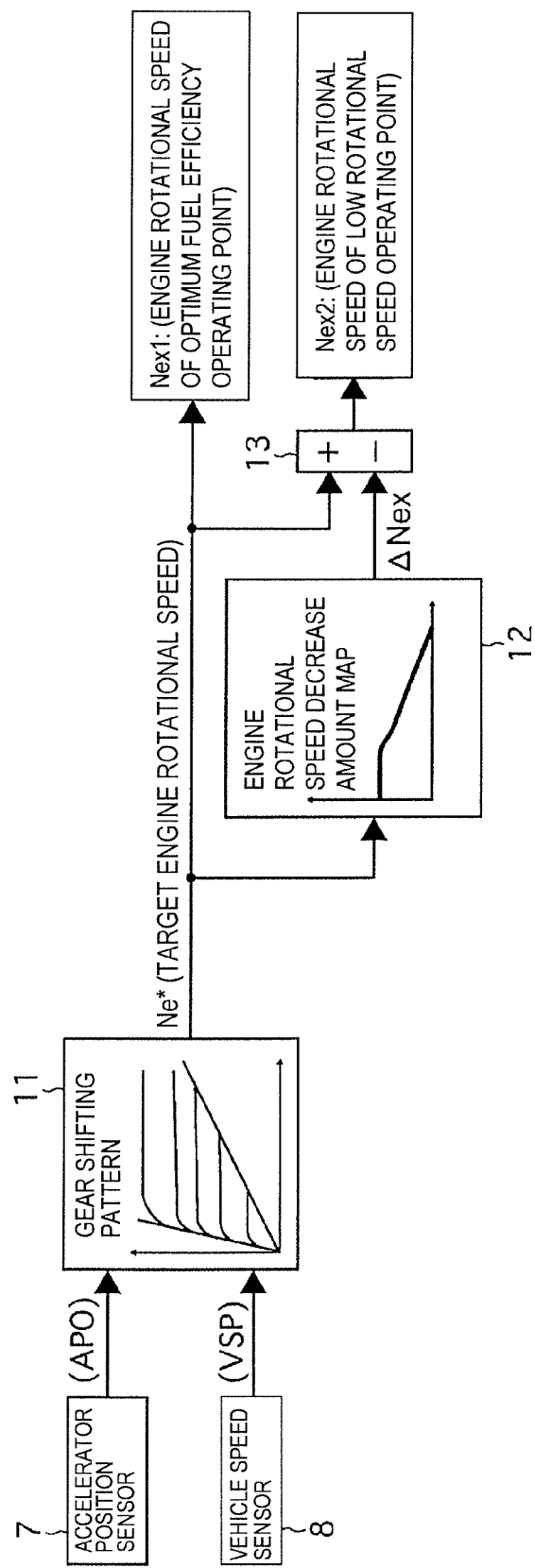
FIG. 9 is a function-based block diagram illustrating how an engine rotational speed of an optimum fuel efficiency operating point and an engine rotational speed of a low rotational speed operating point are computed.

A target engine rotational speed computing section 11 of FIG. 9 is configured to calculate a target engine rotational speed Ne* (to be achieved by controlling the continuously variable transmission) based on an accelerator position APO detected by the accelerator position sensor 7 and a vehicle speed VSP detected by the vehicle speed sensor 8 using the scheduled gear shifting pattern shown in FIG. 2.

As explained previously, in this embodiment, the gear shifting pattern of FIG. 2 is configured such that the target engine rotational speed Ne* obtained for each operating condition (requested output Pe) is the engine rotational speed of an optimum fuel efficiency operating point shown in FIG. 5 (e.g., Nex1 in FIG. 4). Therefore, the target engine rotational speed Ne* calculated by the computing section 11 can be used directly (as is) as the engine rotational speed Nex1 (shown in FIG. 4) of the optimum fuel efficiency operating point shown in FIG. 5. Furthermore, the result obtained with the target engine rotational speed computing section 11 shown in FIG. 9 can be used as is when finding the engine rotational speed Nex1 of the optimum fuel efficiency operating point computed in step S13 of FIG. 3.

Figure 10:
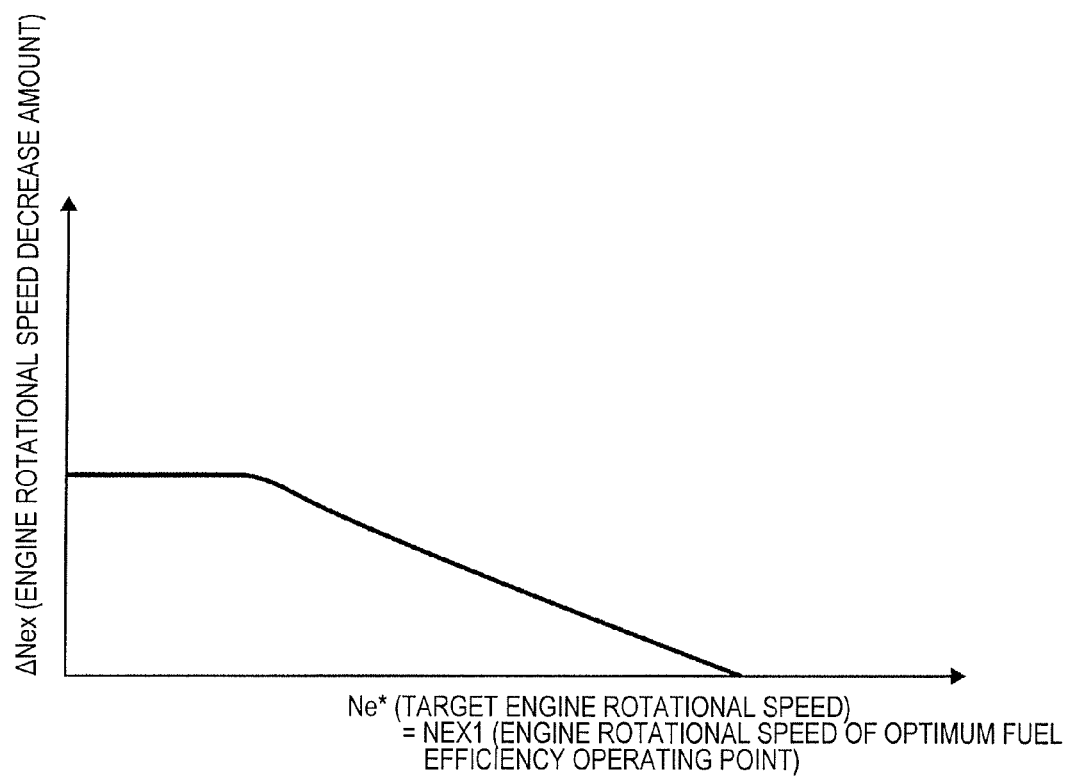
FIG. 10 is a characteristic plot related to an engine rotational speed decrease amount (difference) between an optimum fuel efficiency operating point and a low rotational speed operating point, with this plot being used when computing the engine rotational speed of a low rotational speed operating point as shown in FIG. 9.

An engine rotational speed decrease amount computing section 12 shown in FIG. 9 is configured to find an engine rotational speed decrease amount ΔNex between the low rotational speed operating point X2 and the optimum fuel efficiency operating point X1 calculated in steps (1) to (6) based on the target engine rotational speed Ne* (i.e., the engine rotational speed Nex1 at the optimum fuel efficiency operating point X1) using a characteristic map like that exemplified in FIG. 10. A subtracter 13 shown in FIG. 9 is configured to compute the engine rotational speed Nex2 of the low rotational speed operating point X2 (see FIG. 4) by subtracting the engine rotational speed decrease amount ΔNex from the target engine rotational speed Ne* (engine rotational speed Nex1 of the optimum fuel efficiency operating point X1).

After finding the low rotational speed operating point X2 (see example in FIG. 4) in step S14 of FIG. 3, in step S15 at least one of the controllers 5 and 6 shift the engine operating point from the pre-increase operating point (exemplified as the operating point Y in FIG. 4) at which the engine 1 was operating before the accelerator pedal depression amount was increased and the requested engine output increased to the low rotational speed operating point X2 (see example FIG. 4) found in step S14 such that the post-increase requested engine output is achieved at the low rotational speed operating point X2. The low rotational speed operating point X2 comprises the engine rotational speed Nex2 and the engine torque Tex2. When shifting to the operating point X2, the engine rotational speed Nex2 is achieved by the transmission controller 6 controlling the gear ratio of the continuously variable transmission 2. Meanwhile, the engine torque Tex2 is achieved by the engine controller 5 controlling the opening degree of the electronically controlled throttle valve 1a. Thus, step S15 constitutes a continuously variable transmission control section.

In step S16, at least one of the controllers 5 and 6 compute a time integral of a value obtained by multiplying the post-increase requested engine output Pe by a fuel consumption rate difference between a fuel consumption rate at the optimum fuel efficiency operating point X1 and a fuel consumption rate at the low rotational speed operating point X2. At least one of the controllers 5 and 6 use the time integral to calculate a fuel consumption difference indicating a difference between an amount of fuel that would be consumed at the optimum fuel efficiency operating point X1 and an amount of fuel that would be consumed at the low rotational speed operating point X2. This fuel consumption difference is equivalent to the aforementioned fuel efficiency degradation amount G1, which indicates an amount by which the fuel efficiency (fuel consumption) obtained when the post-increase requested engine output is achieved using the low rotational speed operating point X2 is worse than the fuel efficiency (fuel consumption) obtained when the post-increase requested engine output is achieved using the optimum fuel efficiency operating point X1.

In step S17, at least one of the controllers 5 and 6 calculate an engine rotational speed increase fuel consumption amount G3 for optimum fuel efficiency control that will be used in step S18 to determine if the operation of the engine at the low rotational speed operating point X2 should be ended. The engine rotational speed increase fuel consumption amount G3 for optimum fuel efficiency control is a fuel consumption amount required to increase the engine rotational speed from the engine rotational speed Ney (see example in FIG. 4) of the pre-increase operating point (exemplified as the operating point Y in FIG. 4) to the engine rotational speed Nex1 of the optimum fuel efficiency operating point X1 such that the operating point moves along the optimum fuel efficiency operation curve and the post-increase requested engine output is achieved with the optimum fuel efficiency operating point X1 (see example in FIG. 4).

In other words, the engine rotational speed increase fuel consumption amount G3 for optimum fuel efficiency control is the amount of fuel required in order to increase the engine rotational speed if the post-increase requested engine output is to be achieved with a low fuel consumption operating point (e.g., a fuel economy consumption operating point) by moving the operating point along a low fuel consumption operation curve (e.g., a fuel economy consumption operation curve). Increasing the rotational speed of the engine involves an amount of energy consumed in order to increase the rotational inertia of the engine and an amount of energy consumed in order to operate an actuator used to shift the continuously variable transmission (or to operate a V-belt pulley in the case of a V-belt type continuously variable transmission). Thus, the fuel consumption amount G3 can be calculated by converting these energy amounts into a fuel consumption amount.

In step S18, at least one of the controllers 5 and 6 determine if the operation of the engine at the low rotational speed operating point X2 started in step S15 should be ended by determining if the fuel efficiency degradation amount G1 of the low rotational speed operating point X2 with respect to the optimum fuel efficiency operating point X1 (calculated in step S16) is larger than the engine rotational speed increase fuel consumption amount G3 for optimum fuel efficiency control calculated in step S17.

If the fuel efficiency degradation amount G1 is larger than the engine rotational speed increase fuel consumption amount G3 for optimum fuel efficiency control, then the fuel consumption amount that will result if the post-increase requested engine output continues to be achieved by operating the engine at the low rotational speed operating point X2 is larger than the fuel consumption amount that will result if the post-increase requested engine output is achieved by operating the engine at the optimum fuel efficiency operating point X1. Therefore, from the perspective of fuel efficiency, it is preferable to achieve the post-increase requested engine output using the low rotational speed operating point X2 until the fuel efficiency degradation amount G1 becomes larger than the engine rotational speed increase fuel consumption amount G3 for optimum fuel efficiency control. Then, when G1 becomes larger than G3, it is preferable to move the operating point from the low rotational speed operating point X2 to the optimum fuel efficiency operating point X1 and satisfy the post-increase requested engine output using the optimum fuel efficiency operating point X1. Thus, step S18 constitutes a fuel amount comparing section.

Until the condition G1>G3 is satisfied, control returns from step S18 to step S13 and continues operating the engine at the low rotational speed operating point X2. After the condition G1>G3 is satisfied, control proceeds to step S19 and the operating point is moved from the low rotational speed operating point X2 to the optimum fuel efficiency operating point X1 such that the increased requested engine output is achieved with the engine rotational speed Nex1 and the engine torque Tex1 of the optimum fuel efficiency operating point X1.

The optimum fuel efficiency operating point X1 comprises the engine rotational speed Nex1 and the engine torque Tex1. When shifting to the operating point X1, the engine rotational speed Nex1 is achieved by the transmission controller 6 controlling the gear ratio of the continuously variable transmission 2. Meanwhile, the engine torque Tex1 is achieved by the engine controller 5 controlling the opening degree of the electronically controlled throttle valve 1a. Thus, similarly to the step S15, the step S19 also constitutes a continuously variable transmission control section.

With an engine rotational speed control apparatus utilizing an operating point control according to the first embodiment, when a requested engine output increases due to an increased depression of an accelerator pedal, the engine rotational speed is controlled such that the post-increase (increased) requested engine output is achieved with a low rotational speed operating point X2 while a fuel efficiency degradation amount G1 is smaller than or equal to an engine rotational speed increase fuel consumption amount G3 for optimum fuel efficiency control (step S18). After the fuel efficiency degradation amount G1 becomes larger than the engine rotational speed increase fuel consumption amount G3 for optimum fuel efficiency control (step S18), the engine rotational speed is controlled such that the increased requested engine output is achieved using an optimum fuel efficiency operating point X1. Meanwhile, when the requested engine output decreases (step S11), the engine rotational speed is controlled such that the decreased requested engine output is achieved using an optimum fuel efficiency operating point.

During a period in which the fuel efficiency degradation amount G1 is equal to or smaller than the engine rotational speed increase fuel consumption amount G3 for optimum fuel efficiency control after the requested engine output undergoes an increase, it is advantageous to achieve the increased requested engine output by operating the engine at the low rotational speed operating point X2 than at the optimum consumption operating point X1 even if one takes into account the fuel efficiency degradation amount G1 of the low rotational speed operating point X2 with respect to the optimum fuel efficiency operating point X1. This is true because shifting the operating point to a low rotational speed operating point X2 results in a lower amount of fuel consumed in order to increase the engine rotational speed (i.e., a lower engine rotational speed increase fuel consumption amount) than shifting to a optimum fuel efficiency operating point X1 corresponding to the same engine output (i.e., because the amount by which the engine rotational speed must be increased is decreased from Nex1−Ney to Nex2−Ney). Thus, the rotational speed increase is decreased by the difference amount $\Delta$Nex (e.g., Nex1−Nex2).

Conversely, when the fuel efficiency degradation amount G1 becomes larger than the engine rotational speed increase fuel consumption amount G3 for optimum fuel efficiency control, it is no longer advantageous to continue achieving the increased requested engine output using the low rotational speed operating point X2 because the fuel efficiency degradation amount G1 of the low rotational speed operating point X2 with respect to the optimum fuel efficiency operating point X1 is larger than the amount by which the aforementioned engine rotational speed increase fuel consumption amount G3 was decreased by using the low rotational speed operating point. Therefore, in terms of fuel consumption (fuel efficiency) it becomes advantageous to use an optimum fuel efficiency operating point X1 instead of a low rotational speed operating point X2. Thus, with this embodiment, when the requested engine output is increasing, the increased requested engine output can always be achieved in a manner that is advantageous in terms of fuel consumption.

Meanwhile, when the requested engine output decreases (step S11), the control apparatus returns to an optimum fuel efficiency control. More specifically, instead of executing an engine rotational speed control that controls the engine to a low rotational speed operating point (as described above regarding a case in which the requested engine output increases), an engine rotational speed control that achieves the decreased requested engine output using a optimum fuel efficiency operating point is executed. Operational effects obtained by using an engine rotational speed control that controls the engine to a optimum fuel efficiency operating point when the requested engine output decreases will now be explained.

There times when, after the requested engine output has increased, the requested engine output decreases before the fuel efficiency degradation amount G1 exceeds the engine rotational speed increase fuel consumption amount G3 for optimum fuel efficiency control, i.e., while the fuel efficiency degradation amount G1 is still smaller than or equal to the engine rotational speed increase fuel consumption amount G3 for optimum fuel efficiency control. In such a situation, the engine operating point is shifted from a low rotational speed operating point X2 serving to achieve the previously increased requested engine output to an optimum fuel efficiency operating point Y serving to achieve the newly decreased requested engine output. As a result, the fuel efficiency is improved in comparison with a conventional control scheme in which the engine is always controlled to substantially match an optimum fuel efficiency operating point X1 in order to realize an increased requested engine output. More specifically, when an increased requested engine output is achieved using a low rotational speed operating point X2 having an engine rotational speed Nex2, the engine rotational speed is increased by a smaller amount than if the increased requested engine output were achieved using a optimum fuel efficiency operating point X1 having an engine rotational speed of Nex1 (smaller by the difference amount Nex1−Nex2). Thus, the control apparatus can improve the fuel efficiency by avoiding an unnecessarily large increase of the engine rotational speed and the amount of fuel conserved can be computed based on the amount (Nex1−Nex2) by which the rotational speed increase amount is decreased.

The low rotational speed operation curve indicated in FIG. 5 with a double-dot chain line is set as explained previously with reference to FIGS. 5 to 8. Specifically, a low rotational speed operating point is found for each of a plurality of requested engine outputs. Each low rotational speed operating point is set such that the engine rotational speed of the low rotational speed operating point is smaller than the engine rotational speed of an optimum fuel efficiency operating point corresponding to the same requested engine output by an amount equal to an engine rotational speed decrease amount $\Delta$Nex (see FIG. 8). The engine rotational speed decrease amount $\Delta$Nex is a rotational speed difference value at which the fuel efficiency degradation amount G1 of the low rotational speed operating point with respect to the optimum fuel efficiency operating point is equal to the rotational speed restoration fuel consumption amount G2, which is the amount of fuel required to raise the engine rotational speed when moving from the low rotational speed operating point to the optimum fuel efficiency operating point. By setting the low rotational speed operation curve in this way, a low rotational speed operation curve offering the operational effects described previously can be obtained in a simple and practical fashion.

Furthermore, in this embodiment, the optimum fuel efficiency operation curve is set as a low fuel consumption operation curve or a fuel economy consumption operation curve that achieves each requested engine output with a scheduled fuel economy consumption. The scheduled fuel economy consumption can also be referred to as a scheduled low fuel consumption. More specifically, the optimum fuel efficiency operation curve is made up of optimum fuel efficiency operating points each comprising a combination of an engine rotational speed and an engine torque that can achieve a particular requested engine output with a lowest possible fuel consumption. By controlling the engine operating point using the optimum fuel efficiency operation curve during normal situations in which the requested engine output does not increase and then decrease within a short amount of time, the requested engine output can be achieved with the best possible fuel efficiency and the operational effects explained previously can be enjoyed without sacrificing the advantageous fuel efficiency offered by the optimum fuel efficiency operation curve during normal situations.

It is possible to prepare maps in advance that correspond to the optimum fuel efficiency operation curve indicated with a solid line and the low rotational speed operation curve indicated with a double-dot chain line in FIG. 5 and execute the operating point control (engine rotational speed control) described in this embodiment by searching the maps for optimum fuel efficiency operating points and low rotational speed operating points. However, the number of applicable maps necessary would be large and a large amount of research work would be necessary to prepare the maps. Furthermore, a large amount of memory would be necessary to store the maps. Consequently, such a use of maps is not cost effective.

Conversely, as explained previously with reference to FIG. 9, in this embodiment the gear shifting pattern (shown in FIG. 2) used to control the continuously variable transmission is configured such that an engine rotational speed of an optimum fuel efficiency operating point is set as a target engine rotational speed Ne*. The computing section 11 uses this gear shifting pattern map to find an engine rotational speed Nex1 of an optimum fuel efficiency operating point, and the computing section 12 and subtracter 16 subtract the engine rotational speed decrease amount ΔNex (see FIG. 8) from the engine rotational speed Nex1 of the optimum fuel efficiency operating point to find an engine rotational speed Nex2 of a low rotational speed operating point. In this way, the number of applicable maps, the amount of research work would be necessary to prepare the maps, and the amount of memory necessary to store the maps can all be held in check. As a result, an engine rotational speed control can be accomplished without incurring a disadvantage from a cost effectiveness perspective.

Figure 11:
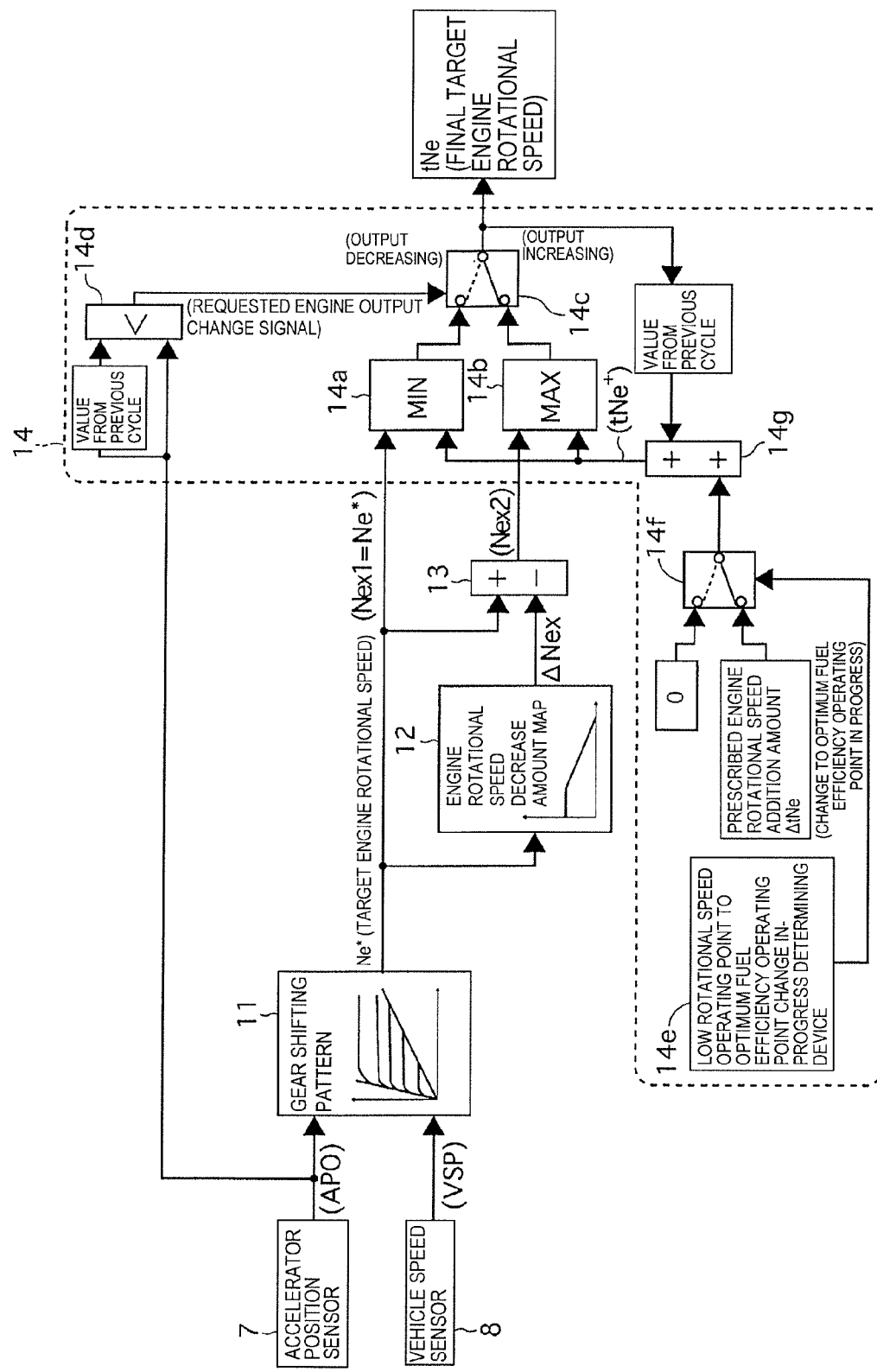
FIG. 11 is a function-based block diagram illustrating processing executed in order to compute a final target engine rotational speed in an engine rotational speed control apparatus according to a second embodiment.

FIG. 11 shows an engine rotational speed control apparatus according to a second embodiment. In this embodiment, an engine rotational speed Nex1 of an optimum fuel efficiency operating point X1 and an engine rotational speed Nex2 of a low rotational speed operating point X2 are each found using the same method as explained previously with reference to FIG. 9. However, in the second embodiment, the engine rotational speeds Nex1 and Nex2 not are selected using a control program like that shown in FIG. 3. Instead, the engine rotational speeds Nex1 and Nex2 are selected using a simpler method such that a final target engine rotational speed tNe can be found and used to execute an engine rotational speed control.

Thus, as shown in FIG. 11, the control apparatus according to this embodiment is provided with a target engine rotational speed computing section 11, an engine rotational speed decrease amount computing section 12, and a subtracter 13 that are basically the same as those shown in FIG. 9. The target engine rotational speed computing section 11 calculates a target engine rotational speed Ne* based on an accelerator pedal opening degree APO and a vehicle speed VSP using the scheduled gear shifting pattern shown in FIG. 2 and sets the target engine rotational speed Ne* as the engine rotational speed Nex1 of the optimum fuel efficiency operating point X1 (see example in FIG. 4). Thus, the target engine rotational speed computing section 11 constitutes a fuel economy consumption operating point computing section.

The engine rotational speed decrease amount computing section 12 finds an engine rotational speed decrease amount ΔNex based on the target engine rotational speed ΔNex (engine rotational speed Nex1 at the optimum fuel efficiency operating point X1) by searching a characteristic map of the engine rotational speed decrease amount ΔNex like that shown in FIG. 10. The subtracter 13 subtracts the engine rotational speed decrease amount ΔNex from the target engine rotational speed Ne* (engine rotational speed Nex1 of the optimum fuel efficiency operating point X1) to obtain the engine rotational speed Nex2 of the low rotational speed operating point X2 (see example in FIG. 4). Thus, the engine rotational speed decrease amount computing section 12 and the subtracter 13 constitutes a low rotational speed operating point computing section.

As shown in FIG. 11, the second embodiment is further provided with a hysteresis generating section 14 that constitutes a fuel amount comparing section and a continuously variable transmission control section. The hysteresis generating section 14 serves to set a hysteresis amount, i.e., a range within which the final target engine rotational speed tNe can change while the requested engine output is increasing due to the accelerator pedal depression amount being increased or decreasing due to the accelerator pedal depression amount being increased.

The hysteresis generating section 14 comprises a low value selector 14a, a high value selector 14b, a target engine rotational speed selector 14c, a requested engine output change determining device 14d, a low rotational speed operating point to optimum fuel efficiency operating point change in-progress determining device 14e, an engine rotational speed addition amount selector 14f, and an engine rotational speed addition amount adder 14g.

Using a similar method to that used in steps S16 to S18 of FIG. 3, the low rotational speed operating point to optimum fuel efficiency operating point change in-progress determining device 14e is configured to determine that it is time for a change of the operating point from the low rotational speed operating point X2 to the optimum fuel efficiency operating point X1 to be started when it determines that operation at the low rotational speed operating point X2 should be ended. Meanwhile, the device 14e determines that a change of the operating point from the low rotational speed operating point X2 to the optimum fuel efficiency operating point X1 has ended when the final target engine rotational speed tNe becomes equal to the engine rotational speed Nex1 of the optimum fuel efficiency operating point X1. The period between when it is determined that a change of the operating point has started until it is determined that the change of the operating point has ended is recognized to be a period during which a change from the low rotational speed operating point X2 to the optimum rotational speed operating point X1 is in progress. Thus, the low rotational speed operating point to optimum fuel efficiency operating point change in-progress determining device 14e constitutes a operating point change determining device.

In order to determine if a change from the low rotational speed operating point X2 to the optimum fuel efficiency operating point X1 has started, there is also a simpler method than the method used in steps S16 to S18 of FIG. 3. As explained regarding calculating the low rotational speed operating point in step S14 of FIG. 3, it is advantageous from the perspective of fuel consumption (fuel efficiency) to use the low rotational speed operating point X2 instead of the optimum fuel efficiency operating point X1 during an period of time t in which a particular acceleration is maintained from a particular vehicle speed. Thus, it is acceptable to determine that it is time to start a change from the low rotational speed operating point X2 to the optimum fuel efficiency operating point X1 when the period of time t has elapsed since acceleration commenced due to an increased depression of the accelerator pedal.

The engine rotational speed addition amount selector 14*f* is configured to select a prescribed engine rotational speed addition amount ΔtNe by adopting the switch position indicated with a solid line in the figure when the low rotational speed operating point to optimum fuel efficiency operating point change in-progress determining device 14*e* determines that a change from the low rotational speed operating point X2 to the optimum fuel efficiency operating point X1 is in progress. The prescribed engine rotational speed addition amount ΔtNe is fed to the engine rotational speed addition amount adder 14*g*. Conversely, when a change from the low rotational speed operating point X2 to the optimum fuel efficiency operating point X1 is not in progress, i.e., during a period from when one operating point change finishes until a next operating point change is started, then the engine rotational speed addition amount selector 14*f* is configured to select 0 as the engine rotational speed addition amount by adopting the switch position indicated with a broken line in the figure. In such a situation, 0 is fed to the engine rotational speed addition amount adder 14*g*.

The engine rotational speed addition amount adder 14*g* is configured to add the engine rotational speed addition amount (either ΔtNe or 0) from the engine rotational speed addition amount selector 14*f* to the final target engine rotational speed tNe of the previous cycle (previous value) to obtain an addition-completed final target engine rotational speed tNe+ (=tNe(previous value)+engine rotational speed addition amount (ΔtNe or 0)).

The low value selector 14*a* is configured to select the smaller of the engine rotational speed Nex1 of the optimum fuel efficiency operating point X1 and the addition-completed final target engine rotational speed tNe+, ie., MIN (Nex1, tNe+). The high value selector 14*b* is configured to select the larger of the engine rotational speed Nex2 of the low rotational speed operating point X2 and the addition-completed final target engine rotational speed tNe+, ie., MAX (Nex2, tNe+). The target engine rotational speed selector 14*c* selects either the output of the low value selector 14*a* or the output of the high value selector 14*b* and sets the selected value as the new final target engine rotational speed tNe of the current cycle.

The requested engine output change determining device 14*d* compares a current accelerator position $APO_n$ and a previous accelerator position $APO_{n-1}$ (value from the previous control cycle) to determine if the requested engine output is increasing due to the accelerator pedal depression amount being increased or if the requested engine output is decreasing due to the accelerator pedal depression amount being decreased. The determination result is used in the switching control executed by the target engine rotational speed selector 14*c*. If the requested engine output change determining device 14*d* determines that the requested engine output is increasing, then the target engine rotational speed selector 14*c* adopts the switch position indicated with a solid line and sets the value selected by the high value selector 14*b* (MAX (Nex2, tNe+)) as the new final target engine rotational speed tNe. The continuously variable transmission 2 is then controlled (engine rotational speed control) such that the rotational speed Ne of the engine 1 is controlled to substantially match the target value tNe. If the requested engine output change determining device 14*d* determines that the requested engine output is decreasing, then the target engine rotational speed selector 14*c* adopts the switch position indicated with a broken line and sets the value selected by the low value selector 14*a* (MIN(Nex1, tNe+)) as the new final target engine rotational speed tNe. The continuously variable transmission 2 is then controlled (engine rotational speed control) such that the rotational speed Ne of the engine 1 is controlled to substantially match the target value tNe.

Figure 12:
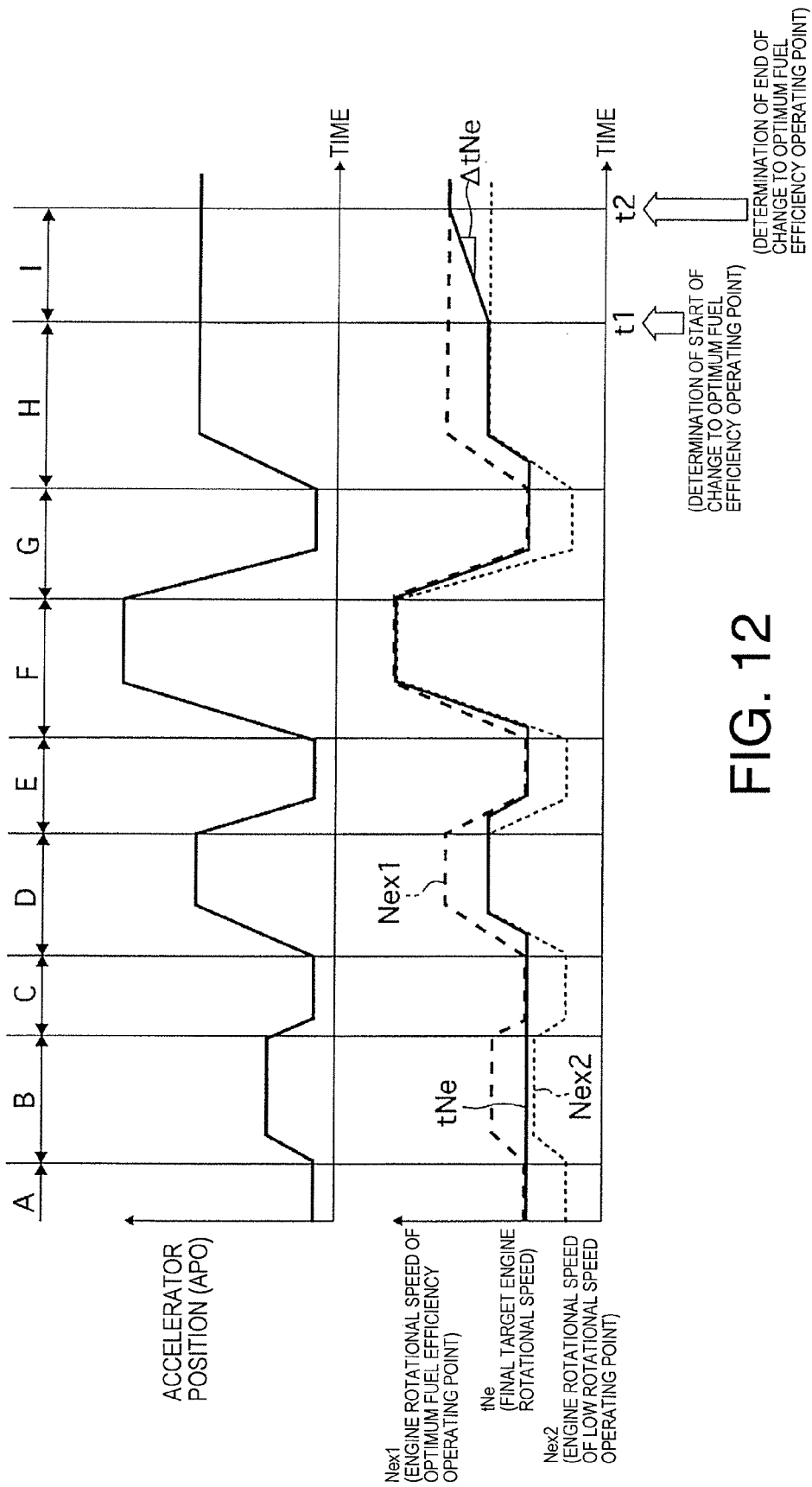
FIG. 12 is an operational waveform chart illustrating the processing executed in order to compute a final target engine rotational speed according to the second embodiment shown in FIG. 11.

With a control apparatus according to the second embodiment, when the accelerator position APO (requested engine output) changes as shown in the intervals A to I of FIG. 12 such that the engine rotational speed Nex1 of the optimum fuel efficiency operating point X1 and the engine rotational speed Nex2 of the low rotational speed operating point X2 change over time as shown in FIG. 12, the final target engine rotational speed tNe changes as shown in the same figure.)

For example, in the interval B, the accelerator position (depression amount) APO increases and, in response, the engine rotational speed Nex1 of the optimum fuel efficiency operating point X1 and the engine rotational speed Nex2 of the low rotational speed operating point X2 both increase. However, the final target engine rotational speed tNe is higher than the engine rotational speed Nex2 of the low rotational speed operating point X2 and the final target engine rotational speed tNe does not change because of the action of the hysteresis generating section 14. Consequently, during this period, the engine rotational speed Ne remains unchanged and the increased requested engine output is satisfied by increasing the engine torque as explained previously.

Figure 13:
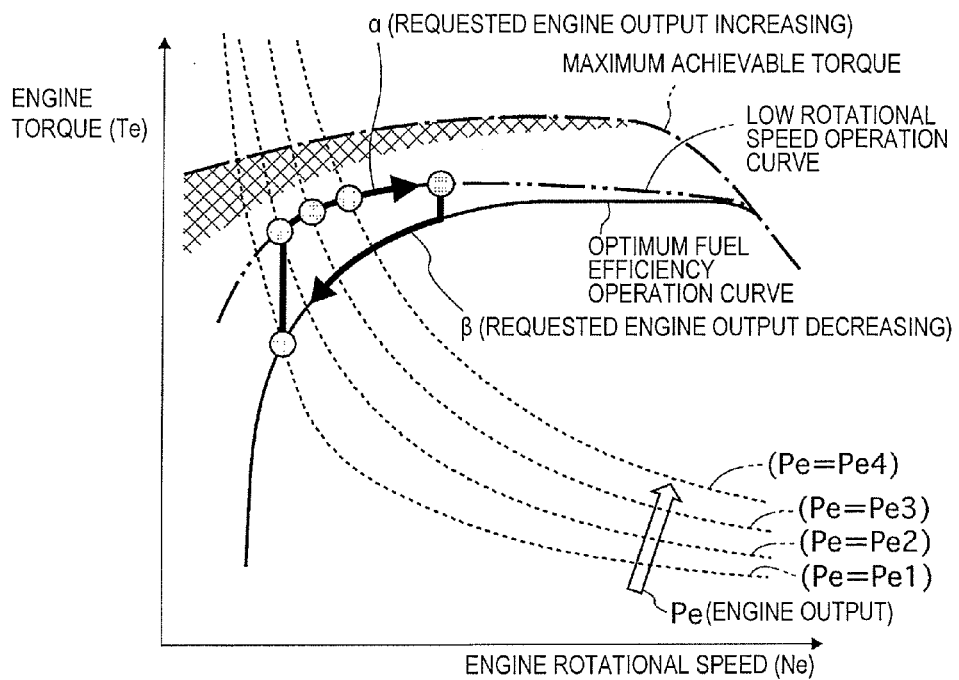
FIG. 13 is an engine performance characteristic plot used to explain the operation of an engine rotational speed control apparatus according to the second embodiment.

Now consider a case in which the accelerator position APO decreases during the interval C and then increases during the interval D by a larger amount than it did in the interval B. In the interval D, the final target engine rotational speed tNe does not change when the accelerator position APO first starts increasing. Then, when the engine rotational speed Nex2 of the low rotational speed operating point X2 becomes larger than the final target engine rotational speed tNe (i.e., when the hysteresis amount is exceeded), the final target engine rotational speed starts increasing along with the engine rotational speed Nex2 of the low rotational speed operating point X2 and the operating point can be moved along the low rotational speed operation curve in a direction of increasing engine output, as indicated in FIG. 13 with the arrow α.

In the interval E, the accelerator position APO is decreased but the final target engine rotational speed tNe does not change when the accelerator position APO first starts decreasing. Then, when the engine rotational speed Nex1 of the optimum fuel efficiency operating point X1 becomes larger than the final target engine rotational speed tNe (i.e., when the hysteresis amount is exceeded), the final target engine rotational speed starts decreasing along with the engine rotational speed Nex1 of the optimum fuel efficiency operating point X1 and the operating point can be moved along the optimum fuel efficiency operation curve in a direction of increasing engine output, as indicated in FIG. 13 with the arrow β.

During the intervals prior to the interval G, the low rotational speed operating point to optimum fuel efficiency operating point change in-progress determining device 14*e* does not determine that the operating point is to be changed from the low rotational speed operating point X2 to the optimum fuel efficiency operating point X1 because the accelerator position APO increases and decreases repeatedly. Therefore, the engine rotational speed addition amount selector 14*f* selects 0 as the engine rotational speed addition amount and the addition-completed final target engine rotational speed tNe+ outputted from the engine rotational speed adder 14*g* is the same as the final target engine rotational speed tNe of the previous control cycle. The aforementioned hysteresis amount, which is obtained from the switching performed by the target engine rotational speed selector 14*c* in response to the increasing and decreasing of the accelerator position APO, decreases as the final target engine rotational speed tNe increases. In some cases the hysteresis amount decreases to 0.

For example, when the accelerator position APO increases by a larger amount as shown in the interval F, the hysteresis amount goes to 0 and the engine rotational speed Nex1 of the optimum fuel efficiency operating point X1, the engine rotational speed Nex2 of the low rotational speed operating point X2, and the final target engine rotational speed tNe become substantially equal to one another.

When the depression amount of the accelerator pedal is increased and held at a large accelerator position APO as shown in the intervals H and I, the low rotational speed operating point to optimum fuel efficiency operating point change in-progress determining device 14e determines that it is time to start changing from the low rotational speed operating point X2 to the optimum fuel efficiency operating point X1 at a moment in time t1. Meanwhile, the target engine rotational speed selector 14c adopts the switch position indicated with a solid line in response to the accelerator position APO. The effects obtained as a result will now be explained.

At the time t1 when the operating point starts changing toward the optimum fuel efficiency operating point X1, the engine rotational speed addition amount selector 14f selects the engine rotational speed addition amount ΔtNe and the engine rotational speed adder 14g starts to add the engine rotational speed addition amount ΔtNe to the final target engine rotational speed tNe of the previous control cycle to obtain the addition-completed final target engine rotational speed tNe+. As a result, instead of changing so as to remain substantially equal to the engine rotational speed Nex2 of the low rotational speed operating point X2 as it does during the interval H, after the moment in time t1 the final target engine rotational speed tNe starts to increase at a time rate corresponding to the engine rotational speed addition amount tNe.

Consequently, since the rate at which the operating point moves from the low rotational speed operating point X2 to the optimum fuel efficiency operating point X1 (i.e., the rate at which the final target engine rotational speed changes) is determined by the engine rotational speed addition amount ΔtNe, the engine rotational speed addition amount ΔtNe is set to as large a value as possible without causing a driver to experience a feeling that something is odd about the vehicle. It is preferable to set the engine rotational speed addition amount ΔtNe to such a value that the operating point (i.e., the final target engine rotational speed tNe) changes at a rate of approximately 100 rpm/sec because using a slower rate of change generally prevents a driver from feeling that something is odd about the vehicle.

When the requested rotational speed and the requested output are both large, it will not feel odd to the driver even if the operating point (final target engine rotational speed tNe) changes at a fast rate. Thus, it is acceptable to prepare a map of the operating point change rate (change rate of the final target engine rotational speed tNe) with respect to the requested output in advance based on experimental data or other information. As an even simpler method, it is also acceptable to prepare a map of the operating point change rate (change rate of the final target engine rotational speed tNe) with respect to the vehicle speed by taking into account the effect a control has when the accelerator depression amount is increased while the vehicle is in a road load state (balanced state) and taking into account the fact that the target engine rotational speed and the target engine torque of the optimum fuel efficiency operating point are determined unambiguously based on the requested output when the vehicle is in a road load state.

As explained previously, after the time t1 shown in FIG. 12, the final target engine rotational speed tNe increases at a time rate corresponding to the engine rotational speed addition amount ΔtNe. As a result, the final target engine rotational speed tNe eventually reaches the engine rotational speed Nex1 of the optimum fuel efficiency operating point X1 at a time t2 shown in the same figure. At the moment in time t2, the) low rotational speed operating point to optimum fuel efficiency operating point change in-progress determining device 14e determines that the operating point has finished changing to the optimum fuel efficiency operating point X1 because the condition tNe=Nex1 has occurred. In response, the engine rotational speed addition amount selector 14f selects 0 as the engine rotational speed addition amount and thus the addition-completed final target engine rotational speed tNe+ outputted from the engine rotational speed adder 14g is the same as the final target engine rotational speed tNe of the previous control cycle. As a result, after the time t2, the final target engine rotational speed tNe stops increasing and is limited to the same value as the engine rotational speed Nex1 of the optimum fuel efficiency operating point X1 such that the post-increase (increased) requested engine rotational speed is achieved with the optimum fuel efficiency operating point X1.

The second embodiment achieves all of the same operational effects as the first embodiment. Additionally, in the second embodiment, the final target engine rotational speed tNe is controlled such that it automatically converges toward the engine rotational speed Nex1 of the optimum fuel efficiency operating point X1 without making a transitional determination as to whether it is time to stop operating at the low rotational speed operating point X2 (step S18 of FIG. 3), which essential in the first embodiment. Consequently, the computational load can be reduced in the second embodiment because it is not necessary to execute the transitional determination (step S18 of FIG. 3). Additionally, there is a possibility that the transitional determination will be incorrect or late in the first embodiment. In the second embodiment, this possibility can be eliminated because a transitional determination is not executed and, thus, the degraded drivability and degraded fuel efficiency that could result from an incorrect transitional determination can also be avoided.

Moreover, if the transitional determination is incorrect or late, there will be risk that the operating point will enter a region near full-load operation normally used for maximum torque (cross hatched region in FIG. 13). In this region near full-load operation, the fuel efficiency declines markedly and the fuel consumption increases because an ignition timing retardation control and/or an air-fuel ratio enrichment control is executed as a countermeasure against knocking. With the second embodiment, however, a transitional determination is not necessary and, thus, there is no risk of an incorrect or late transitional determination occurring. As a result, the engine operating point changes as indicated by the arrow α and can be prevented from entering the region near full-load operation, thus eliminating the possibility that the fuel consumption will increase due to the operating point entering that region.

In FIG. 10, the characteristic used to indicate how the engine rotational speed decrease amount ΔNex changes between the low rotational speed operating point X2 and the optimum fuel efficiency operating point X1 is a function of the target engine rotational speed Ne* (engine rotational speed Nex1 at the optimum fuel efficiency operating point X1) alone. A more realistic characteristic can be obtained using a characteristic that is a function of both the target engine rotational speed Ne* (engine rotational speed Nex1 at the optimum fuel efficiency operating point X1) and the vehicle speed VSP (output speed of the continuously variable transmission 2), as shown in FIG. 14.

The reason why this occurs will now be explained. In order to find a characteristic of the engine rotational speed decrease amount ΔNex in the embodiments, it is necessary to statistically determine an amount of time t during which acceleration is maintained, as is clear from previously explained steps (1) to (6). That is, if the vehicle speed and acceleration are known, then the vehicle speed that will be reached can be known based on the driving environment of the type of vehicle and the acceleration continuation time t can be calculated. Thus, if the acceleration rate is the same, then the acceleration continuation time t will be different for different vehicle speeds.

Figure 14:
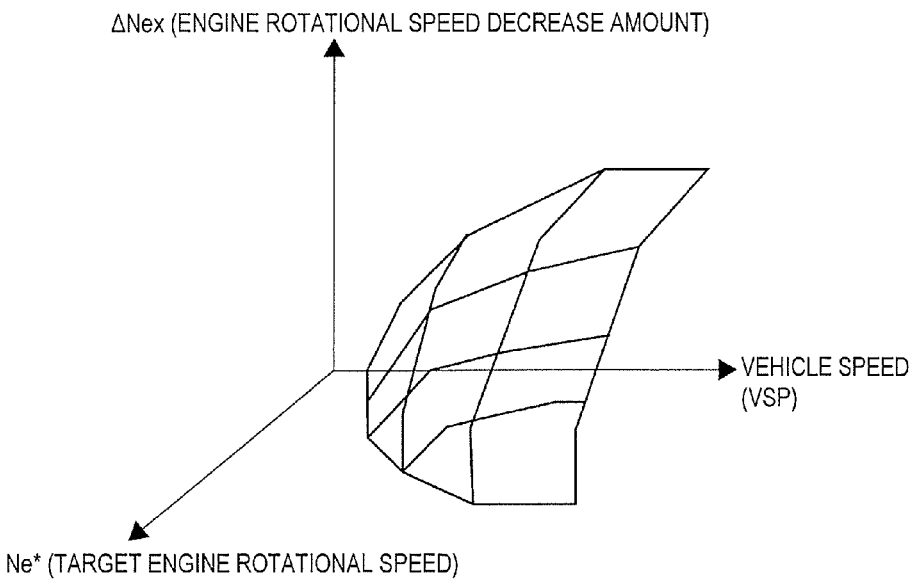
FIG. 14 is an alternative characteristic plot related to an engine rotational speed decrease amount (difference) between an optimum fuel efficiency operating point and a low rotational speed operating point.

Therefore, as shown in FIG. 14, a characteristic map of the engine rotational speed decrease amount ΔNex (difference) between the low rotational speed operating point X2 and the optimum fuel efficiency operating point X1 can be made with respect to both the target engine rotational speed Ne* (engine rotational speed Nex1 at the optimum fuel efficiency operating point X1) and the vehicle speed VSP (output speed of the continuously variable transmission 2). As indicated by the solid lines, the map sets the engine rotational speed decrease amount ΔNex to be smaller when the target engine rotational speed Ne* (engine rotational speed Nex1 at the optimum fuel efficiency operating point X1) is larger and smaller when the vehicle speed VSP (output speed of the continuously variable transmission 2) is smaller.

With a map like that shown in FIG. 14, the engine rotational speed decrease amount ΔNex (i.e., the difference) between the low rotational speed operating point X2 and the optimum fuel efficiency operating point X1 can be matched more closely to the requested output and the fuel efficiency can be improved in a more refined manner.

Figure 15:
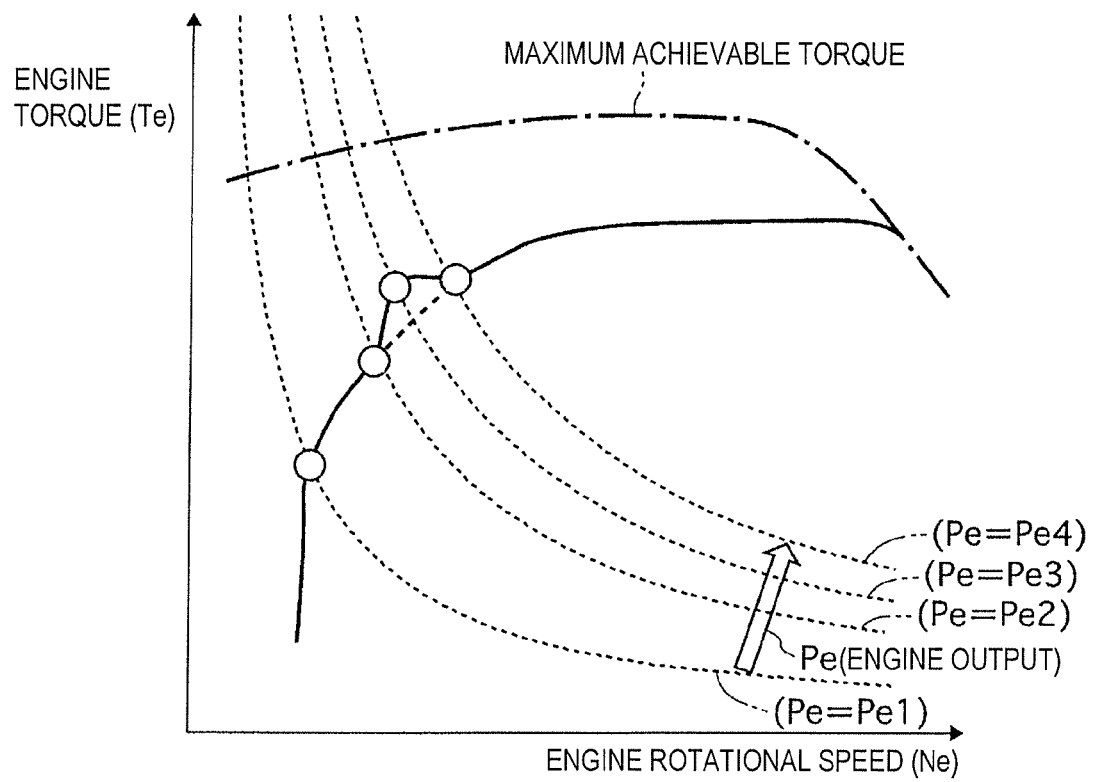
FIG. 15 is an engine performance characteristic plot illustrating a situation in which a discontinuity of the operating point occurs because of deviation between variation of the accelerator pedal depression amount and variation of the target engine rotational speed during execution of an optimum fuel efficiency control configured to make an actual operation point trace an optimum fuel efficiency operation curve.

In the previously explained embodiments, an optimum fuel efficiency operation curve (optimum fuel efficiency operating points) is used as a low fuel consumption operation curve (low fuel consumption operating points) at which a requested engine output is achieved with a minimum amount of fuel. However, in an actual vehicle, there is a possibility that deviation will occur between variation of the accelerator position APO and variation of the target engine rotational speed during execution of an optimum fuel efficiency control configured to faithfully trace an optimum fuel efficiency operation curve. In such a case, the operating point will change (move) as shown in FIG. 15 and a driver will experience an odd feeling.

In order to avoid imparting an odd feeling to a driver while still tracing the optimum fuel efficiency operation curve as closely as possible, a smoothing control is sometimes executed to smooth the change characteristic of the operating point to such a degree that a driver does not experience an odd feeling. In such a case, the smoothing control results in a fuel efficiency emphasized operating curve being used as a low fuel consumption operation curve (e.g, a fuel economy consumption operation curve), which is preferable from the standpoint of eliminating the aforementioned odd feeling experienced by a driver.

Additionally, in the previously explained embodiments, a low rotational speed operation curve (low rotational speed operating point) is calculated in the steps (1) to (7). However, when the intervals between the requested engine outputs Pe1, Pe2, Pe3 and Pe4 are very small, the engine rotational speed Nex2 of the low rotational speed operating point X2 is substantially the same as the engine rotational speed Ney of the pre-increase operating point Y used before the requested engine rotational speed increased (see FIG. 4). Therefore, substantially the same operational effects can be obtained when the low rotational speed operating point X2 shown in FIG. 4 is set, for convenience, such that the engine rotational speed Nex2 is the same as the engine rotational speed Ney of the pre-increase operating point Y. With this approach, it is not necessary to rely on the first seven steps to find the low rotational speed operation curve (low rotational speed operating point). This is very advantageous because the low rotational speed operation curve (low rotational speed operating point) can be set in an extremely simple fashion and the cost of the apparatus can be greatly reduced.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine rotational speed control apparatus comprising:
   a fuel economy consumption operating point computing section configured to determine a fuel economy consumption operating point based on a combination of an engine rotational speed and an engine torque lying on a fuel economy consumption operation curve that achieves a requested engine output with a scheduled fuel economy consumption;
   a rotational speed suppression operating point computing section configured to determine a rotational speed suppression operating point based on a combination of the engine rotational speed and the engine torque lying on a rotational speed suppressing operation curve that achieves the requested engine output with the engine rotational speed being lower than would be obtained using the fuel economy consumption operating point lying on the fuel economy consumption operation curve;
   a requested engine output change detecting section configured to detect a change in the requested engine output;
   a fuel amount comparing section configured to determine if a fuel efficiency degradation amount is larger than a rotational speed restoration fuel consumption amount upon the requested engine output change detecting section detecting that the requested engine output has increased to an increased requested engine output, with the fuel efficiency degradation fuel increase amount indicating an amount by which a fuel consumption amount that would result if the increased requested engine output was achieved using the rotational speed suppression operating point exceeds a fuel consumption amount that would result if the increased requested engine output was achieved using another fuel economy consumption operating point of the fuel economy consumption operation curve, and the rotational speed restoration fuel consumption amount indicating an amount of fuel that would be consumed by increasing the engine rotational speed to move the rotational speed suppression operating point from the rotational speed suppressing operation curve to the another fuel economy consumption operating point corresponding to the requested engine output; and a continuously variable transmission control section configured to control the engine rotational speed by controlling the gear ratio of the continuously variable transmission such that the increased requested engine output is achieved using the rotational speed suppression operating point before the fuel amount comparing section determines that the fuel efficiency degradation fuel increase amount is larger than the rotational speed restoration fuel consumption amount, such that the increased requested engine output is achieved using the fuel economy consumption operating point after the fuel amount comparing section determines that the fuel efficiency degradation fuel increase amount is larger than the rotational speed restoration fuel consumption amount, and such that the requested engine output is achieved using the fuel economy consumption operating point when the requested engine output change detecting section detects that the requested engine output has decreased.

2. The engine rotational speed control apparatus as recited in claim 1, wherein
the fuel economy consumption operation curve is a fuel efficiency operation curve made up of fuel efficiency operating points that are based on the engine rotational speed and the engine torque at which a given engine output is achieved with a minimum amount of fuel consumption.

3. The engine rotational speed control apparatus as recited in claim 1, wherein
the fuel economy consumption operation curve is a fuel efficiency emphasized operating curve obtained by applying a smoothing processing to changes of the fuel economy consumption operating point while tracing a fuel efficiency operation curve made up of fuel efficiency operating points that are based on the engine rotational speed and the engine torque at which a given engine output is achieved with a minimum amount of fuel consumption.

4. The engine rotational speed control apparatus as recited in claim 1, wherein
the rotational speed suppressing operation curve is set such that the engine rotational speed of the rotational speed suppression operating point is lower than the engine rotational speed of the fuel economy consumption operating point at which a given requested engine output is achieved by an engine rotational speed decrease amount at which the fuel efficiency degradation fuel increase amount of the rotational speed suppression operating point with respect to the fuel economy consumption operating point is substantially equal to an engine rotational speed recovery fuel consumption amount that indicates a fuel consumption amount required to increase the engine rotational speed so as to change from the rotational speed suppression operating point to the fuel economy consumption operating point.

5. The engine rotational speed control apparatus as recited in claim 4, wherein
the continuously variable transmission control section includes a scheduled gear shifting pattern that is used in a gear shifting control of the continuously variable transmission such that the engine rotational speed of the fuel economy consumption operating point is set as a target engine rotational speed;

the fuel economy consumption operating point computing section is further configured to find the engine rotational speed of the fuel economy consumption operating point using the gear shifting pattern; and the rotational speed suppression operating point computing section is configured to find the engine rotational speed of the rotational speed suppression operating point by subtracting the engine rotational speed decrease amount from the engine rotational speed of the fuel economy consumption operating point that was found using the gear shifting pattern.

6. The engine rotational speed control apparatus as recited in claim 5, wherein
the fuel amount comparing section is further configured to select the larger of the target engine rotational speed that is currently used and the engine rotational speed of the rotational speed suppression operating point as a new target engine rotational speed when the requested engine output change detecting section detects that the requested engine output has increased, and to select the smaller of the target engine rotational speed that is currently used and the engine rotational speed of the fuel economy consumption operating point as the new target engine rotational speed when the requested engine output change detecting section detects that the requested engine output has decreased; and the continuously variable transmission control section is further configured to control the continuously variable transmission to the new target engine rotational speed.

7. The engine rotational speed control apparatus as recited in claim 6, wherein
the fuel amount comparing section is further configured to determine if a change from the rotational speed suppression operating point to the fuel economy consumption operating point is in progress, and to use an engine rotational speed obtained by adding a prescribed rotational speed to a current target engine rotational speed instead of using the current target engine rotational speed when the operating point change determining device determines that a change from the rotational speed suppression operating point to the fuel economy consumption operating point is in progress.

8. The engine rotational speed control apparatus as recited in claim 4, wherein
the engine rotational speed decrease amount is set in accordance with an output rotational speed of the continuously variable transmission such that as the output rotational speed of the continuously variable transmission becomes slower, the engine rotational speed decrease amount becomes smaller.

9. A vehicle comprising:
an engine;
a continuously variable transmission operatively coupled to the engine; and
a control apparatus having a configuration that selectively controls a gear ratio of the continuously variable transmission and an engine control parameter of the engine such that the engine operates at an operating point that achieves a target drive force based on a vehicle speed and an accelerator position, with the operating point of the control apparatus being based on a combination of an engine rotational speed and an engine load lying on a predetermined operation curve in an operation region of the engine that is defined based on the engine rotational speed and the engine load, the configuration of the control apparatus being further configured such that when the target drive force increases to an increased target drive force while the engine is operating at the operating point on the predetermined operation curve, the gear ratio of the continuously variable transmission and the engine control parameter are controlled to operate the engine at an alternate operating point that achieves the increased target drive force with a lower engine rotational speed and a higher engine load than a standard operating point that lies on the predetermined operation curve and corresponds to the increased target drive force, and afterwards the gear ratio of the continuously variable transmission and the engine control parameter are controlled such that the engine operates at the standard operating point that lies on the predetermined operation curve and corresponds to the increased target drive force.

* * * * *